(12) United States Patent
Chai

(10) Patent No.: US 12,425,817 B2
(45) Date of Patent: Sep. 23, 2025

(54) USER SERVICE PROCESSING METHOD, SYSTEM, AND RELATED DEVICE

(71) Applicant: HUAWEI TECHNOLOGIES CO., LTD., Shenzhen (CN)

(72) Inventor: Xiaoqian Chai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/987,405

(22) Filed: Nov. 15, 2022

(65) Prior Publication Data

US 2023/0109543 A1    Apr. 6, 2023

Related U.S. Application Data

(63) Continuation of application No. PCT/CN2021/093032, filed on May 11, 2021.

(30) Foreign Application Priority Data

May 15, 2020   (CN) .......................... 202010414154.0

(51) Int. Cl.
*H04W 4/24*    (2024.01)
*H04M 15/00*    (2006.01)

(52) U.S. Cl.
CPC .............. *H04W 4/24* (2013.01); *H04M 15/66* (2013.01)

(58) Field of Classification Search
CPC ....... H04W 4/24; H04W 24/02; H04M 15/66; H04M 15/785; H04M 15/80;
(Continued)

(56) References Cited

U.S. PATENT DOCUMENTS

| | | |
|---|---|---|
| 10,425,539 B2 | 9/2019 | Xu et al. |
| 2013/0176908 A1 | 7/2013 | Baniel et al. |

(Continued)

FOREIGN PATENT DOCUMENTS

| | | |
|---|---|---|
| CN | 107872594 A | 4/2018 |
| CN | 110417560 A | 11/2019 |
| WO | 2019182573 A1 | 9/2019 |

OTHER PUBLICATIONS

Cisco Systems et al., "Discussion on supporting simultaneous online and offline charging methods", 3GPP TSG-SA2 Meeting #136 S2-1911464, Reno Nevada, USA, Nov. 18, 2019-Nov. 22, 2019, total 6 pages.

(Continued)

*Primary Examiner* — Huy C Ho
(74) *Attorney, Agent, or Firm* — HAUPTMAN HAM, LLP

(57) ABSTRACT

A service processing method and a related product is applied to the charging field. A policy control device generates a first policy of a user service, and sends the first policy to a session management function device to indicate the session management function device to perform a first quota management mode on the user service. The policy control device receives related information of a second quota management mode of a user or the user service, and determines the second quota management mode. The policy control device generates a second policy of the user service based on the second quota management mode, where the second policy is for updating or replacing the first policy. According to this method, the quota management mode of the user service is time-effective, ensuring a balance between a latency condition and credit control risks.

20 Claims, 11 Drawing Sheets

(58) Field of Classification Search
CPC ......... H04M 15/8016; H04M 15/8228; H04M 15/854; H04L 12/1407
USPC ........................................................ 455/406
See application file for complete search history.

(56) References Cited

U.S. PATENT DOCUMENTS

2020/0145538 A1    5/2020  Qiao et al.
2021/0051235 A1*   2/2021  Cai .................... H04L 41/0894

OTHER PUBLICATIONS

3GPP TS 32.290 V16.3.0 (Dec. 2019), 3rd Generation Partnership Project; Technical Specification Group Services and System Aspects; Telecommunication management; Charging management; 5G system; Services, operations and procedures of charging using Service Based Interface (SBI) (Release 16), 34 pages.
International Search Report issued in corresponding International Application No. PCT/2021/093032, dated Aug. 10, 2021, pp. 1-9.
Extended European Search Report issued in corresponding European Application No. 21805004.5, dated Oct. 4, 2023, pp. 1-13.

* cited by examiner

USER SERVICE PROCESSING METHOD, SYSTEM, AND RELATED DEVICE

CROSS-REFERENCE TO RELATED APPLICATIONS

This application is a continuation of International Patent Application No. PCT/CN2021/093032, filed on May 11, 2021, which claims priority to Chinese Patent Application No. 202010414154.0, filed on May 15, 2020. The disclosures of the aforementioned applications are hereby incorporated by reference in their entireties.

BACKGROUND

According to 3GPP (3rd Generation Partnership Project, 3rd Generation Partnership Project) standard specifications, a session management function (Session Management Function, SMF) device usually requests a quota in a blocking mode for a user service. To be specific, the SMF device needs to obtain the quota through requesting before starting the user service. Quota request in the blocking mode helps reduce credit control risks and reduce a possibility of suffering losses for carriers. However, this increases an access latency of the user service, and affects provisioning of latency-sensitive services, affecting user experience.

Latency-sensitive services supported by a 5G (5th Generation, 5th Generation) network, for example, uRLLC (ultra-reliable Low-Latency Communication, ultra-reliable low-latency communication) services, have a high requirement on the access latency. Therefore, the 3GPP standard specifications define quota request in a non-blocking mode and a quota management suspend mode for an online charging service. For the quota request in the non-blocking mode, the session management function device does not need to obtain a quota authorization for the user service before starting a user service. In other words, the session management function device may start the user service before requesting a quota of the user service, or may start the user service while requesting a quota of the user service, to help reduce the access latency of the user service. The session management function device may consider suspend quota management of the online charging service as a temporary offline charging user service or an unlimited quota user service in the user service, so that the session management function device does not need to frequently request the quota for the user service in a process of using the user service.

However, if the non-blocking mode is blindly used for initial quota request, the following problems exist: The SMF device may find, after the user service is started, that the quota fails to be obtained, causing a waste of resources, and incurring DoS attacks (Denial of Service, denial of service) on a network from malicious users. However, using the suspend quota management mode may cause serious resource waste and carriers' losses.

How to balance between network element performance, an access latency requirement of a user service, credit control risks, and network security is a technical problem that urgently needs to be resolved.

SUMMARY

In view of this, embodiments described herein provide a user service processing method, to determine a quota management mode of a user service, so as to achieve a balance between performance of a charging system, an access latency of the user service, and credit control risks.

According to a first aspect, at least one embodiment provides a service processing method performed by a policy control device. A policy control device generates a first policy of a user service, and sends the first policy to a session management function device. The first policy indicates whether to perform a first quota management mode on the user service of a user. In an execution process of the service, the policy control device receives related information, that is sent by a charging processing device and that is for changing the first quota management mode, of a second quota management mode of the user or the user service, and determines the second quota management mode based on the related information of the second quota management mode of the user or the user service. The policy control device generates a second policy of the user service based on the second quota management mode, where the second policy is for updating or replacing the first policy, and indicates whether to perform the second quota management mode on the user service. According to this method, in the execution process of the service, the charging processing device sends the second quota management mode for changing the first quota management mode. Then the policy control device generates the second policy based on the second quota management mode, to update or replace the executed first policy. In this way, the quota management mode of the user service is time-effective, ensuring a balance between a latency and credit control risks.

In at least one embodiment, the policy control device further receives related information of the first quota management mode of the user or the user service, where the related information of the first quota management mode is sent by the charging processing device. The policy control device determines the first quota management mode of the user service based on the related information of the first quota management mode of the user or the user service. Therefore, the first quota management mode is determined by the charging processing device, to ensure that determining of the first quota management mode is real-time.

In at least one embodiment, the first quota management mode includes a first initial quota request mode, and the second quota management mode includes a second initial quota request mode. The first initial quota request mode includes a blocking mode, and the second initial quota request mode includes a non-blocking mode; or the first initial quota request mode includes a non-blocking mode, and the second initial quota request mode includes a blocking mode.

In at least one embodiment, the first quota management mode includes suspend quota management and the second quota management mode includes resume quota management; or the first quota management mode includes resume quota management and the second quota management mode is suspend quota management.

Different first quota management modes is used to implement different quota management modes for different services, to meet service diversity and to satisfy users.

In at least one embodiment, the policy control device further sends a request message to the charging processing device. The policy control device receives a response message sent by the charging processing device, where the response message carries related information of the first quota management mode of the user or the user service. The policy control device determines the first quota management mode of the user service based on the related information of the first quota management mode of the user or the user service. According to this method, the policy control device requests from the charging processing device to obtain the related information of the first quota management mode.

In at least one embodiment, the first quota management mode includes the first initial quota request mode, and the request message further carries an obtaining indication for the first quota management mode. The obtaining indication includes an identifier of the user and indication information for obtaining a service list in the non-blocking mode of the user, and the related information of the first quota management mode carried in the response message includes a list of services of the user that are allowed to use the first initial quota request mode in the non-blocking mode. Alternatively, the obtaining indication includes an identifier of the user service and indication information for obtaining whether a user service is allowed to use the first initial quota request mode in the non-blocking mode, and the related information of the first quota management mode carried in the response message includes indication information of whether the user service is allowed to use the first initial quota request mode in the non-blocking mode. The obtaining indication includes an identifier of the user and indication information for obtaining whether a service of the user is allowed to use the first initial quota request mode in the non-blocking mode, and the related information of the first quota management mode carried in the response message includes indication information of whether the service of the user is allowed to use the first initial quota request mode in the non-blocking mode. The obtaining indication includes an identifier of the user service and indication information for obtaining the first initial quota request mode of the user service, the related information of the first quota management mode carried in the response message includes the first initial quota request mode of the user service, and the first initial quota request mode includes the blocking mode or the non-blocking mode. The obtaining indication includes an identifier of the user and indication information for obtaining a first initial quota request mode of services of the user, the related information of the first quota management mode carried in the response message includes the first initial quota request mode of the services of the user, and the first initial quota request mode includes the blocking mode or the non-blocking mode. According to this method, the policy control device obtains the first initial quota request mode based on a plurality of indications. In addition, the first quota management mode includes the first initial quota management mode, so that the blocking mode or the non-blocking mode is used for the user service for different user services.

In at least one embodiment, the first quota management mode is suspend or resume quota management, and the request message further carries an obtaining indication for the first quota management mode. The obtaining indication includes an identifier of the user and indication information for obtaining a service list that allows suspend quota management and that is of the user, and the related information of the first quota management mode carried in the response message includes a service list that allows suspend quota management and that is of the user. Alternatively, the obtaining indication includes an identifier of the user service and indication information for obtaining whether a user service allows suspend quota management, and the related information of the first quota management mode carried in the response message includes indication information of whether quota management of the user service is allowed to be suspended. Alternatively, the obtaining indication includes an identifier of the user and indication information for obtaining whether quota management of a service of the user is allowed to be suspended, and the related information of first quota management mode carried in the response message includes indication information of whether quota management of the service of the user is allowed to be suspended. Alternatively, the obtaining indication includes an identifier of the user service and indication information for obtaining the first quota management mode of the user service, the related information of the first quota management mode carried in the response message is the first quota management mode of the user service, and the first quota management mode includes suspend quota management or resume quota management. Alternatively, the obtaining indication includes an identifier of the user and indication information for obtaining quota management modes of services of the user, the related information of the first quota management mode carried in the response message includes information about the first quota management mode of the services of the user, and the first quota management mode includes suspend quota management or resume quota management. According to this method, the policy control device obtains suspend or resume quota management based on a plurality of indications. In addition, the first quota management mode is suspend or resume quota management, so that suspend quota management or resume quota management is used for the user service for different user services.

In at least one embodiment, the related information of the first quota management mode of the user or the user service is: indication information indicating whether the service of the user is allowed to use the non-blocking mode, or indication information indicating whether quota management of the service of the user is allowed to be suspended.

In at least one embodiment, in response to the first quota management mode being the first initial quota request mode, the first policy includes indication of the first initial quota request mode, and the first initial quota request mode includes the non-blocking mode or the blocking mode. In response to the first quota management mode of the user service being suspend quota management, a charging method of the user service included in the first policy is offline charging or temporary offline charging. In response to the first quota management mode of the user service being resume quota management, a charging method of the user service included in the first policy is online charging. The first quota management mode is indicated by using the first policy, so that the user service is performed in the first quota management mode. Therefore, implementation of the service meets both a condition of the service and a condition of the user.

In at least one embodiment, that the policy control device receives the related information of the second quota management mode that is sent by the charging processing device and that is for changing the first quota management mode includes: The policy control device receives a notification message for the user or the user service, where the notification message is sent by the charging processing device, and carries the related information of the second quota management mode of the user service. According to this method, the policy control device obtains the second quota management mode from the charging processing device, so that the first quota management mode is replaced, to ensure the quota management mode of the user service is real-time.

In at least one embodiment, the first quota management mode includes the first initial quota request mode in the blocking mode or the non-blocking mode, and the related information of the second quota management mode of the user service includes any one of the following: a list of services of the user that are allowed to use the second initial quota request mode in the non-blocking mode; indication information indicating whether the service of the user is allowed to use the second initial quota request mode in the non-blocking mode; indication information indicating whether the user service is allowed to use the second initial quota request mode in the non-blocking mode; or the second initial quota request mode of the user service. According to this method, the policy control device obtains the second initial quota request mode based on a plurality of indications. In addition, the second quota management mode is the second initial quota management mode, so that the blocking mode or the non-blocking mode is used for the user service for different user services.

In at least one embodiment, the first quota management mode is suspend or resume quota management, and the related information of the second quota management mode of the user service includes any one of the following: a service list that allows suspend quota management and that is of the user; indication information indicating whether quota management of the user service is allowed to be suspended; indication information indicating whether quota management of the service of the user is allowed to be suspended; or a quota management mode that is of the user service and that suspends or resumes quota management. According to this method, the policy control device obtains a plurality of second quota management modes. In addition, the second quota management mode is suspend or resume quota management, so that suspend quota management or resume quota management is used for the user service, to meet conditions of different user services and different scenarios.

In at least one embodiment, the policy control device stores the second quota management mode of the user service, so that the second quota management mode is used for the user service next time, and the quota management mode of the user service is determined more quickly, to save network resources.

In at least one embodiment, in response to the second quota management mode being the second initial quota request mode, the second policy includes the second initial quota request mode of the user service, and the second initial quota request mode includes the blocking mode or the non-blocking mode; or in response to the second quota management mode of the user service being suspend quota management, a charging method of the user service included in the second policy is offline charging or temporary offline charging; or in response to the second quota management mode of the user service being resume quota management, a charging method of the user service included in the second policy is online charging. The second quota management mode is indicated by using the second policy, so that the user service is performed in the first quota management mode. Therefore, implementation of the service meets a condition of the service and a condition of the user.

In at least one embodiment, the policy control device sends the second policy to the session management function device, where the second policy is for updating the first policy of the user service. Alternatively, the policy control device sends a deactivation instruction of the first policy and an activation instruction of the second policy to the session management function device.

According to a second aspect, at least one embodiment provides a user service processing method performed by a charging processing device. In this method, the charging processing device determines that a first quota management mode of a user service of a user is changed to a second quota management mode, and sending a notification message to a policy control device. The notification message carries related information of the second quota management mode of the user or the user service, and the second quota management mode is for changing the first quota management mode. According to this method, in an execution process of the service, the charging processing device sends the second quota management mode for changing the first quota management mode. In this way, the quota management mode of the user service is time-effective, ensuring a balance between a latency and credit control risks.

In at least one embodiment, the first quota management mode includes a first initial quota request mode, and the second quota management mode includes a second initial quota request mode. The first initial quota request mode includes a blocking mode, and the second initial quota request mode includes a non-blocking mode; or the first initial quota request mode includes a non-blocking mode, and the second initial quota request mode includes a blocking mode.

In at least one embodiment, the first quota management mode includes suspend quota management and the second quota management mode includes resume quota management; or the first quota management mode includes resume quota management and the second quota management mode is suspend quota management.

In at least one embodiment, in response to processing a charging request of the user service, or processing a charging request of another service of the user, or performing a charging management process on an account of the user, the charging processing device determines that the first quota management mode of the user service is to be changed. According to this method, the first quota management mode is changed in a plurality of scenarios, so that the quota management mode of the user service is time-effective, ensuring a balance between a latency and credit control risks.

In at least one embodiment, the charging processing device receives the charging request of the user service, where the charging request includes indication information of the first quota management mode used by the user service; and determines, based on the indication information of the first quota management mode, that the first quota management mode of the user service is to be changed to the second quota management mode. Alternatively, the charging processing device determines that related information of the first quota management mode of the user service has been sent to the policy control device; and the charging processing device determines, based on the first quota management mode, to change the first quota management mode of the user service to the second quota management mode. According to this method, the charging processing device determines, in a plurality of manners, to change the first quota management mode, to implement determining flexibility and meet conditions of a plurality of user services.

In at least one embodiment, the charging processing device stores the second quota management mode of the user service, so that the second quota management mode is used for the user service next time, and the quota management mode of the user service is determined more quickly, to save network resources.

In at least one embodiment, the charging processing device determines that there is a resource created for the user. The charging processing device sends the notification message to the policy control device based on a notification address corresponding to the resource.

The charging processing device receives the request message sent by the policy control device; and sends a response message to the policy control device, where the response message carries the related information of the first quota management mode of the user or the user service.

According to a third aspect, a policy control apparatus is provided. The apparatus body has a function of implementing the policy control apparatus in the first aspect. The function is implemented by hardware, or is implemented by hardware executing corresponding software. The hardware or the software includes one or more modules corresponding to the function.

According to a fourth aspect, a charging processing apparatus is provided. The apparatus body has a function of implementing the charging processing apparatus in the second aspect. The function is implemented by hardware, or is implemented by hardware executing corresponding software. The hardware or the software includes one or more modules corresponding to the function.

According to a fifth aspect, at least one embodiment provides a user service processing method. In this method, a policy control device determines a first quota management mode of a user service; generates a first policy of the user service based on the first quota management mode, and sends the first policy to a session management function device, where the first policy indicates whether to perform the first quota management mode on the user service. Then, the charging processing device sends, to the policy control device, related information of a second quota management mode of the user service that is for changing the first quota management mode. After receiving the related information of the second quota management mode, the policy control device determines the second quota management mode based on the related information of the second quota management mode of the user service, and generates a second policy of the user service based on the second quota management mode, where the second policy is for updating or replacing the first policy.

According to a sixth aspect, at least one embodiment provides a user service processing system, including a policy control device and a charging processing device. The policy control device performs the methods performed by the policy control device in the first aspect or any one of the possible solutions of the first aspect. The charging processing device performs the methods performed by the charging processing device in the second aspect or any one of the solutions of the second aspect.

According to a seventh aspect, at least one embodiment provides a user service processing system, including a policy control device and a session management function device. The policy control device performs the methods performed by the policy control device in the first aspect or any one of the solutions of the first aspect. The session function management device is configured to receive a first policy or a second policy sent by the policy control device.

In at least one embodiment, the session management function device further performs any step or method that is performed by the session management device in FIG. 2 to FIG. 6.

According to an eighth aspect, at least one embodiment provides a user service processing system, including a policy control device, a session management function device, and a charging processing device. The policy control device performs the methods performed by the policy control device in the first aspect or any one of the solutions of the first aspect. The charging processing device performs the methods performed by the charging processing device in the second aspect or any one of the solutions of the second aspect. The session function management device is configured to receive a first policy or a second policy sent by the policy control device.

In at least one embodiment, the session management function device further performs any step or method that is performed by the session management device in FIG. 2 to FIG. 6.

According to a ninth aspect, at least one embodiment provides a charging processing device (101), including a processor and a memory.

The memory is configured to store program instructions.

The processor is configured to invoke and execute the program instructions stored in the memory, so that the charging processing device (101) performs the user service processing method in the second aspect or any one of the solutions in the second aspect.

According to a tenth aspect, at least one embodiment provides a computer-readable storage medium, including instructions. In response to the instructions being run on a computer, the computer is enabled to perform the user service processing method in the second aspect or any one of the solutions in the second aspect.

According to an eleventh aspect, at least one embodiment provides a policy control device (104), including a processor and a memory.

The memory is configured to store program instructions.

The processor is configured to invoke and execute the program instructions stored in the memory, so that the session management function device (102) performs the user service processing method in the first aspect or any one of the solutions in the first aspect.

According to a twelfth aspect, at least one embodiment provides a computer-readable storage medium, including instructions. In response to the instructions being run on a computer, the computer is enabled to perform the user service processing method in the first aspect or any one of the solutions in the first aspect.

According to a thirteenth aspect, at least one embodiment provides a chip. In response to the chip running, the chip is configured to implement the method in the first aspect, the second aspect, any one of the implementations of the first aspect, or any one of the implementations of the second aspect.

DESCRIPTION OF EMBODIMENTS

The following describes the technical solutions in embodiments with reference to the accompanying drawings. In the descriptions of embodiments described herein, "/" represents an "or" relationship between associated objects unless otherwise specified. For example, A/B represents A or B. The term "and/or" indicates an association relationship for describing associated objects and indicates that three relationships exist. For example, A and/or B indicates the following three cases: Only A exists, both A and B exist, and only B exists, where A and B is singular or plural. In addition, "a plurality of" means two or more than two unless otherwise specified. In addition, to clearly describe the technical solutions in embodiments described herein, words such as "first" and "second" are used in embodiments described herein to distinguish between same items or similar items that have basically the same functions or purposes. A person skilled in the art understand that the terms such as "first" and "second" do not limit a quantity or an execution sequence, and that the terms such as "first" and "second" do not indicate a definite difference.

Figure 1A:
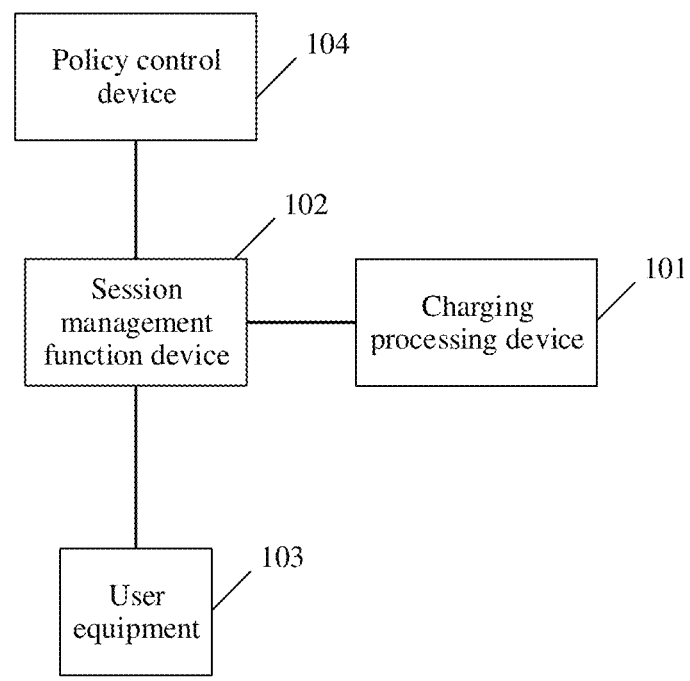
FIG. 1A is a schematic diagram of a system architecture to which at least one embodiment is applied.

FIG. 1A is a diagram of an architecture of a charging system according to at least one embodiment. The charging system is configured to control a session management function device to process a user service, and includes a charging processing device 101, a session management function device 102, a user equipment 103, and a policy control device 104. Main functions of these devices are separately described as follows.

The charging processing device 101 is communicatively connected to the session management function device 102 and the policy control device 104. The charging processing device 101 is configured to: receive quota request information, usage information, and the like reported by the session management function device, and perform charging processing on the user service. In addition, the charging processing device 101 determines or changes a quota management mode of a user service based on account information of a user, and sends the quota management mode of the user service to the policy control device 104, or sends the account information of the user to the policy control device 104, so that the policy control device 104 determines the quota management mode of the user service.

The charging processing device 101 is a CHF (Charging Function, charging function) device defined in 3GPP standard specifications, or is a CCS (Converged Charging System, converged charging system) device defined in the 3GPP standard specifications, and includes functions of a CHF device.

During actual application, the charging system shown in FIG. 1A has more charging processing devices 101. For example, a cluster is constructed, including a plurality of charging processing devices 101 which are mutually backed up. This improves a redundancy capability, and achieve high availability.

For ease of description, in embodiments described herein, the charging processing device 101 is sometimes directly referred to as a CHF device.

The session management function device 102 is communicatively connected to the charging processing device 101, the policy control device 104, and the user equipment 103. The device is configured to:

(1) receive a user service start request (a request message for requesting the session management function device to start a user service) from the user equipment 103, start the user service based on the start request, and perform charging operations such as quota management and usage reporting on the user service;

(2) carry, in a charging request to the charging processing device 101, the quota management mode adopted for the user service, so that the charging processing device 101 changes the quota management mode of the user service based on the account information of the user and/or the usage information of the user service; and (3) request a policy of the user service from the policy control device 104, and perform quota management on the user service based on the policy sent by the policy device 104 or an updated policy and the quota management mode carried in the policy or the updated policy.

During actual application, the charging system shown in FIG. 1A has more session management function devices. The session management function devices is communicatively connected to a same charging processing device 101 (for example, the charging processing device 101), or is communicatively connected to different charging processing devices 101. A plurality of service start requests initiated by a same user equipment for a same user service is processed by a same session management function device or different session management function devices.

The user equipment 103, connected to the session management function device, is configured to: send a user service start request to the session management function device, and access or use the user service via the session management function device.

The user equipment 103 is a user equipment (user equipment, UE) defined in the 3GPP standard specifications, or is a wireless access device having a wireless communication function or a wired access device having no wireless communication function, including a handheld device, a vehicle-mounted device, a wearable device, or a computing device. For example, the user equipment 103 is a mobile phone (mobile phone), a tablet computer, or a computer having a wireless transceiver function. Alternatively, the user equipment 103 is a virtual reality (virtual reality, VR) terminal device, an augmented reality (augmented reality, AR) terminal device, a wireless terminal in industrial control, a wireless terminal in self driving, a wireless terminal in telemedicine, a wireless terminal in a smart grid, a wireless terminal in a smart city (smart city), a wireless terminal in a smart home (smart home), and the like.

During actual application, the charging system shown in FIG. 1A includes more user equipment.

The policy control device 104 is communicatively connected to the session management function device 102 and the charging processing device 101, is configured to provide a charging policy of the user service for the session management function device 102, and is further configured to provide the session management function device 102 with related information of a quota management mode corresponding to the user service or a service of the user.

The policy control device 104 is a policy control function (Policy Control Function, PCF) device or a policy and charging rules function (Policy and Charging rules Function, PCRF) device defined in the 3GPP standard specification.

The foregoing "connected" or "connection" includes a direct connection or a communication connection by using one or more intermediate network devices.

Figure 1B:
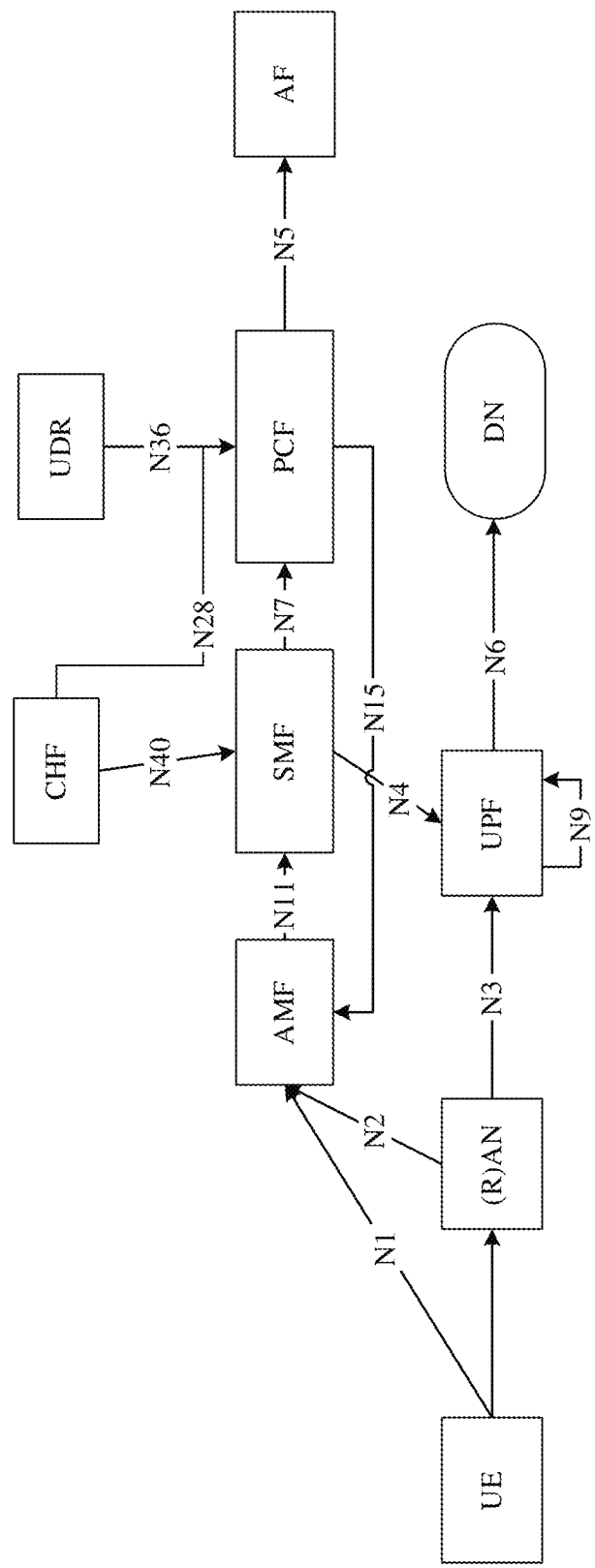
FIG. 1B is a schematic diagram of an architecture of a 5G system to which this application is applied.

FIG. 1B is a schematic diagram of an architecture of a basic 5G system. As shown in FIG. 1B, the system includes: an access and mobility management function (access and mobility management function, AMF), a session management function (session management function, SMF), a radio access network (radio access network, RAN), unified data management (unified data management, UDM), a policy control function (policy control function, PCF), a data network (data network, DN), a user plane function (user plane function, UPF), UE, an application function (application function, AF), a unified data repository (unified data repository, UDR), and a charging function (charging function, CHF). Optionally, the following functions (not shown in FIG. 1B) are further included in FIG. 1B: a network slice selection function (network slice selection function, NSSF), an authentication server function (authentication server function, AUSF), a network exposure function (network exposure function, NEF), a network repository function (NF repository function, NRF).

Main functions of the network elements are described as follows:

The AF is understood as the name of an application function network element in a 5G architecture. The application function network element mainly transfers a condition of an application side on a network side, for example, a quality of service (quality of service, QoS) condition. The AF is a third-party functional entity, or is an operator-deployed application service, for example, an IP multimedia subsystem (IP Multimedia Subsystem, IMS) voice call service.

The UDM is understood as the name of a unified data management network element in the 5G architecture. The unified data management network element mainly includes the following functions: unified data management, authentication credential processing in a 3GPP authentication and key agreement mechanism, user identity processing, access authorization, registration and mobility management, subscription management, short message service management, and the like.

The UDR is understood as the name of a unified data repository network element in the 5G architecture. The unified data repository network element mainly includes the following functions: storage and retrieval of subscription data, storage and retrieval of policy data, storage and retrieval of application data, and storage and retrieval of other types of data.

The PCF is understood as the name of a policy control function network element in the 5G architecture. The policy control function network element mainly includes policy control functions such as performing session-level or service flow-level charging, QoS bandwidth guarantee and mobility management, and UE policy decision. In this system, a PCF connected to the AMF is a PCF for access and mobility control (PCF for access and mobility control, AM PCF), and a PCF connected to the SMF is a PCF for session management (PCF for session management, SM PCF). In actual deployment, the AM PCF and the SM PCF is different PCF entities.

The SMF is understood as the name of a session management network element in the 5G architecture. The session management network element mainly performs functions such as session management, execution of a control policy delivered by the PCF, UPF selection, and UE IP address allocation.

The AMF is understood as the name of a mobility management network element in the 5G architecture. The mobility management network element mainly includes the following functions related to access and mobility, for example, connection management, mobility management, registration management, access authentication and authorization, reachability management, and security context management.

The UPF is understood as the name of a user plane function network element in the 5G architecture. The user plane function network element mainly includes the following functions related to a user plane, for example, data packet routing and transmission, packet detection, service usage reporting, QoS processing, lawful interception, uplink packet detection, and downlink data packet storage.

A (R)AN is a (radio) access network, and corresponds to different access networks in 5G, for example, a wired access network and a wireless base station access network.

DN is a data network, and is used to identify a name of a carrier network access point. In at least one embodiment, the DN further includes an authentication, authorization, and accounting (authentication, authorization, accounting, AAA) server function, and is responsible for performing secondary authentication on the user.

CHF is a charging function. The CHF is responsible for reporting charging status information to the PCF and interacting with the SMF to implement quota management and charging control.

Functions of interfaces are described as follows:
N7 represents an interface between the PCF and SMF, and is configured to deliver a PDU session granularity and a service data flow granularity control policy.
N15 represents an interface between the PCF and the AMF, and is configured to deliver a UE policy and an access control related policy.
N5 represents an interface between the AF and the PCF, and is configured to deliver an application service request and report a network event.
N4 represents an interface between the SMF and UPF, and is configured to transmit information between a control plane and a user plane, including delivery of forwarding rules, QoS control rules, traffic statistics rules, and the like from the control plane to the user plane, and reporting of user-plane information.
N11 represents an interface between the SMF and the AMF, and is configured to: transmit PDU session tunnel information between the RAN and the UPF, transmit a control message to be sent to the UE, transmit radio resource control information to be sent to the RAN, and the like.
N2 represents an interface between the AMF and the RAN, and is configured to transmit radio bearer control information from the core network to the RAN and perform another operation.

N1 represents an interface between the AMF and the UE, is access-irrelevant, and is configured to transmit the QoS control rule to the UE and perform another operation.

N8 represents an interface between the AMF and the UDM, and is used by the AMF to obtain, from the UDM, subscription data related to access and mobility management and authentication data, and used by the AMF to register current mobility management related information of the UE with the UDM.

N10 represents an interface between the SMF and the UDM, and is used by the SMF to obtain, from the UDM, subscription data related to session management, and used by the SMF to register current session related information of the UE with the UDM.

N35 represents an interface between the UDM and the UDR, and is used by the UDM to obtain user subscription data information from the UDR.

N36 represents an interface between the PCF and the UDR, and is used by the PCF to obtain policy-related subscription data and application data related information from the UDR.

N3 represents an interface between the RAN and the UPF, and is configured to transmit user plane data between the RAN and the UPF.

N6 represents an interface between the UPF and the DN, and is configured to transmit the user plane data between the UPF and the DN.

N9 represents an interface between UPFs, for example, an interface between a visited-policy control function (visited-policy control function, V-PCF) and a home-policy control function (home-policy control function, H-PCF), or an interface between a UPF connected to the DN and a UPF connected to the RAN, and is configured to transmit the user plane data between the UPFs.

N28 represents an interface between the PCF and the CHF, and is used by the PCF to subscribe to charging status (Policy Counter) information, such as a user balance status and a remaining traffic status, from the UDR.

N40 represents an interface between the SMF and the CHF, and is used by the SMF to report charging information (Charging data) to the CHF and obtain a quota (Credit) threshold from the CHF.

The architecture of the charging system shown in FIG. 1A or FIG. 1B enables the charging processing device 101 and/or the policy device to determine the quota management mode of the user service in a timely and dynamic manner, for example, determine or change the quota management mode of the user service based on the account information of the user and/or the usage information of the user service in the process of using the service. In this way, an initial quota request in a non-blocking mode or suspend quota management is used in the case of low credit control risks of the user service, and a quota request in a blocking mode or resume quota management is used in the case of high credit control risks of the user service. Therefore, this incorporates an access latency of the user service, carriers' conditions for system performance, and control of credit risks.

For ease of understanding embodiments described herein, the following explains some concepts.

A user service is a service accessed or used by the user equipment 103 via a network device (for example, the session management function device 102 or a user plane device not shown in FIG. 1A). The user service is a service in a protocol data unit (Protocol Data Unit, PDU) session. For example, one or more data flows corresponding to a rating group (Rating Group, RG) in a PDU session, or a data flow corresponding to an RG and a service identifier in a PDU session is understood as the user service in embodiments described herein. In at least one embodiment, "a user service in a PDU session" or "a service in a PDU session" means a plurality of data flows corresponding to the RG in the PDU session, or is a data flow corresponding to a service identifier in the plurality of data flows corresponding to the RG.

For ease of description, in at least one embodiment, the user service is sometimes directly referred to as a "service".

The user service accessed or used by the user equipment 103 is mainly described in embodiments herein by using a data connection service in a 5G network as an example. Correspondingly, charging data in at least one embodiment is mainly described by using information related to data traffic as an example. The information related to the data traffic includes but is not limited to: information that is about the PDU session and that is collected by the session management function device, usage of a service unit allowed to pass in the PDU session, a charging trigger condition, a timestamp, and the like.

A service of a user is one or more services subscribed to by the user. The service of the user is a user service in a PDU session in use, or is a service not in use that is subscribed to by the user.

Starting a user service means that, after receiving a start request of the user service, the session management function device allows the user service to pass. Allowing the user service to pass includes allowing signaling or data of the user service to pass. For example, in response to a user service being the foregoing data connection service, "starting a user service" includes continuing to establish or perform an update operation on a PDU session for the data connection service (in response to the PDU session being unavailable) or allowing a service data flow to pass (in response to the PDU session being available).

A quota management mode (Quota Management Mode, QMM) is a method for processing an online charging user service by the session management function device 102 (which may alternatively be a charging trigger device). Specifically, in at least one embodiment, the quota management mode is an initial quota request mode (Initial Quota Request Mode, IQRM) (or an initial quota request mode) of an online charging user service, or the quota management mode is suspend/resume quota management (Suspend/Resume Quota Management, SRQM) of the online charging user service. The initial quota request mode is a mode in which a quota is requested for the user service for the first time after the start request of the user service is received. The initial quota request mode is blocking mode quota request or non-blocking mode quota request, which are described as follows.

The blocking mode initial quota request (Blocking Mode Initial Quota Request, BLIQR) means that the session management function device 102 first requests a quota from the charging processing device 101 for the user service in response to the start request of the user service received from the user equipment 103, and starts the user service only after receiving a quota granted by the charging processing device 101 for the user service.

The non-blocking mode initial quota request (Non-Blocking Mode Initial Quota Request, NBIQR) means that, in response to the start request of the user service received from the user equipment 103, the session management function device 102 preferentially starts the user service before requesting a quota from the charging processing device 101 for the user service, or requests the quota from the charging processing device 101 for the user service while starting the user service.

Suspend/resume quota management (Suspend/Resume Quota Management, SRQM) means that suspend or resume quota management is used for an online charging service in the case of sufficient balance or no credit control risks. In response to suspend quota management being used for a user service, the user service is considered as a temporary offline charging service or an unlimited quota service, and the session management function device 102 does not request a quota from the charging processing device 101 for the user service. However, quota management is resumed or enabled for normal quota management for a user in the case of insufficient balance in the user's account or in the case of existence of credit control risks for the user.

Quota management mode indication information (Quota Management Mode Indication, QMMInd) includes information indicating which quota management mode (such as IQRM or SRQM) has been used for the user service in response to the session management function device 102 receiving the start request of the user service. The quota management mode indication information includes only a value of IQRM or SRQM, or includes an IQRMod field and a value thereof, or includes an SID (identifier of the user service) field and a value thereof. A data structure of the quota management mode indication information is not limited in embodiments described herein.

In at least one embodiment, "using a quota management mode for a user service" is sometimes described as "using a mode of initial quota request for a user service".

The following further describes an example of method procedures that is implemented based on the charging system architecture shown in FIG. 1A. As shown in FIG. 2, FIG. 3A, FIG. 3B, FIG. 4, FIG. 5A, and FIG. 5B, in a method procedure corresponding to each figure, a session management function entity corresponds to the session management function device 102 in FIG. 1A, a charging processing device 101 corresponds to the charging processing device 101 in FIG. 1A, a user equipment corresponds to the user equipment 103 in FIG. 1A, and a policy control device 104 corresponds to the policy control device 104 in FIG. 1A. Details are not described in subsequent descriptions of these method procedures.

Figure 2:
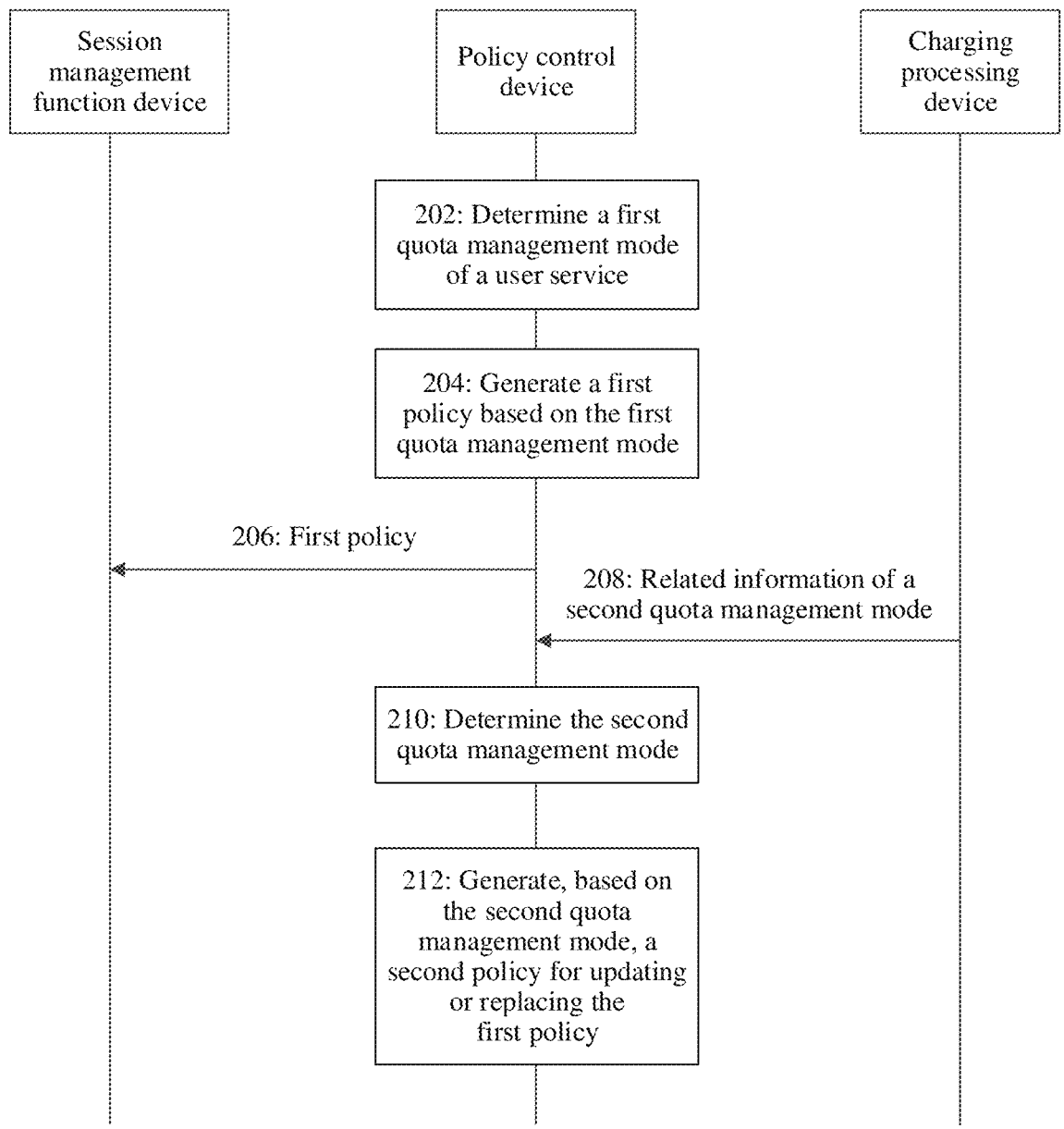
FIG. 2 is a flowchart of a user service processing method according to at least one embodiment.

In a method procedure corresponding to FIG. 2, a policy control device 104 generates a second policy based on related information that is of a second quota management mode and that is sent by a charging processing device 101, to update or replace a first policy that has been executed by a session management function device 102. The method procedure mainly includes the following steps.

Step 202: The policy control device 104 determines a first quota management mode of a user service. The first quota management mode of the user service is a quota management mode determined by the policy control device 104 for the user service before the user service starts.

The first quota management mode includes a first initial quota request mode. The first initial quota request mode includes a non-blocking mode or a blocking mode. A first initial quota request mode in a blocking mode indicates that a quota granted by the charging processing device 101 is to be obtained before the user service starts. A first initial quota request mode in a non-blocking mode means that a quota granted by the charging processing device 101 is not obtained before the user service starts.

The first quota management mode alternatively is suspend/resume quota management. Suspend quota management means that the user service is considered as a temporary offline charging service or an unlimited quota service, and the session management function device 102 does not request a quota from the charging processing device 101 for the user service. Resume quota management means performing normal quota management for the user.

In an example, before performing step 202, the policy control device 104 receives related information that is of the first quota management mode of a user or the user service and that is sent by the charging processing device 101. Then, the policy control device 104 determines the first quota management mode of the user service based on the related information of the first quota management mode of the user or the user service.

In another example, before performing step 202, the policy control device 104 obtains account information of the user or configuration information of the user from the charging processing device 101 or another network device. Then, the policy control device 104 determines the first quota management mode of the user service based on the obtained account information or configuration information of the user.

In an optional step, before performing step 202, the policy control device 104 sends a request message to the charging processing device 101. The policy control device 104 receives a response message sent by the charging processing device 101, where the response message carries the related information of the first quota management mode of the user or the user service.

Step 204: The policy control device 104 generates the first policy, where the first policy indicates whether to perform the first quota management mode for the user service.

In response to the first quota management mode being the first initial quota request mode, the first policy includes indication of the first initial quota request mode, and the first initial quota request mode includes the non-blocking mode or the blocking mode. In response to the first quota management mode of the user service being suspend quota management, a charging method of the user service included in the first policy is offline charging or temporary offline charging. In response to the first quota management mode of the user service being resume quota management, a charging method of the user service included in the first policy is online charging.

Step 206: The policy control device 104 sends the first policy to the session management function device 102.

Step 208: The policy control device 104 receives the related information of the second quota management mode that is sent by the charging processing device 101 and that is for changing the first quota management mode. The second quota management mode means that, the first quota management mode determined before is changed or replaced after the service starts.

In this step, the policy control device 104 receives a notification message for the user or the user service sent by the charging processing device 101. The notification message carries the related information of the second quota management mode of the user service.

In an optional manner, the first quota management mode includes a first initial quota request mode, and the second quota management mode includes a second initial quota request mode. The first initial quota request mode includes a blocking mode, and the second initial quota request mode includes a non-blocking mode; or the first initial quota request mode includes a non-blocking mode, and the second initial quota request mode includes a blocking mode.

In another optional manner, the first quota management mode is suspend quota management, and the second quota management mode includes resume quota management; or the first quota management mode includes resume quota management, and the second quota management mode is suspend quota management.

Step 210: The policy control device 104 determines the second quota management mode based on the related information of the second quota management mode of the user service.

Step 212: The policy control device 104 generates a second policy of the user service, where the second policy is for updating or replacing the first policy, and the second policy further indicates whether to perform the second quota management mode on the user service.

In response to the second quota management mode being the second initial quota request mode, the second policy includes the second initial quota request mode of the user service, and the second initial quota request mode includes the blocking mode or the non-blocking mode. In response to the second quota management mode of the user service being suspend quota management, a charging method of the user service included in the second policy is offline charging or temporary offline charging. In response to the second quota management mode of the user service being resume quota management, a charging method of the user service included in the second policy is online charging.

In response to the second policy including a policy identifier that is the same as an identifier of the first policy, the policy control device 104 sends the second policy to the session management function device 102. The identifier related to the first policy indicates that the second policy is for updating the first policy of the user service. In another example, the policy control device 104 allocates a second policy identifier to the second policy. The policy control device 104 sends the second policy and the second policy identifier to the session management function device 102, where the second policy identifier indicates that the second policy is for replacing the executed first policy. For example, the session management function device 102 indicates, based on the second policy identifier, to deactivate the first policy and activate the second policy.

According to the method procedure corresponding to FIG. 2, the policy control device 104 determines the second quota management mode based on the related information of the second quota management mode that is sent by the charging processing device 101 and that is for changing the first quota management mode of the user service, and generates the second policy for replacing or updating the first policy, so that the quota management mode is changed dynamically. This helps balance, dynamically and in real time, a relationship between an access latency of an end user, carriers' conditions for system performance, and control of credit risks.

For the method procedure corresponding to FIG. 2, further refer to method procedures corresponding to FIG. 3A, FIG. 3B, FIG. 4, FIG. 5A, FIG. 5B, and FIG. 6 provided in embodiments described herein.

Figure 3A:
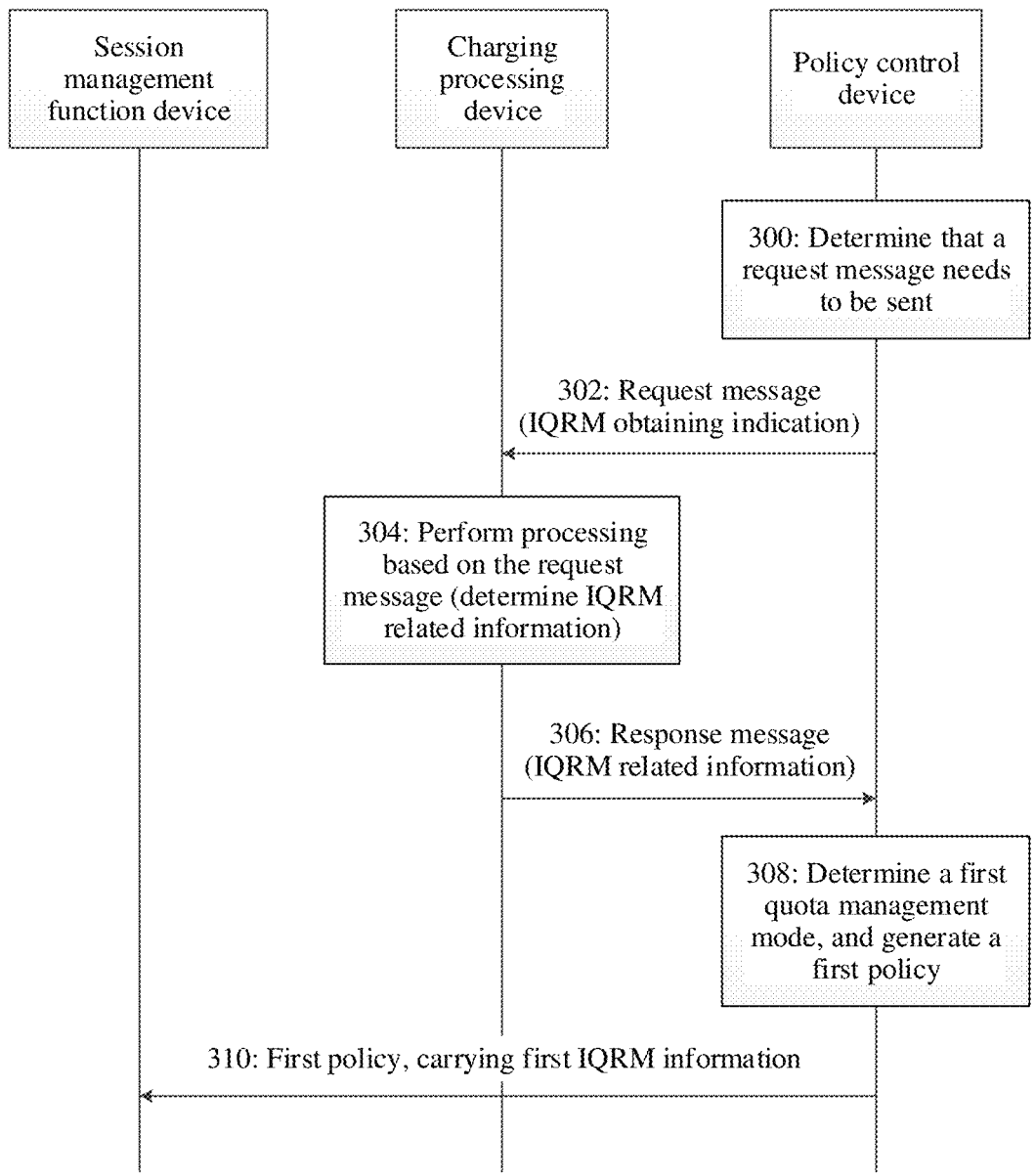
FIG. 3A is a flowchart of a method for determining a first quota management mode of a user service by a policy control device according to at least one embodiment.

FIG. 3A is a flowchart of a method for determining, by a policy control device 104, a quota management mode of a user service according to at least one embodiment. In the method procedure corresponding to FIG. 3A, the quota management mode is an initial quota request mode (IQRM). The policy control device 104 receives quota management mode IQRM information of a user or a user service from a charging processing device 101, further determines an initial quota request mode of the user service, and generates a policy based on the determined initial quota request mode of the user service. The method procedure mainly includes the following steps.

Step 300: The policy control device 104 determines that a request message is to be sent to the charging processing device 101.

Specifically, after receiving a policy obtaining request of the user service or a policy update request of the user service that is sent by a session management function device 102, the policy control device 104 determines, in response to the policy obtaining request or the policy update request, that information is to be obtained from the charging processing device 101. Generally, in response to receiving a request for establishing a PDU session for a user, the session management function device 102 sends a policy obtaining request to the policy control device 104. The session management function device 102 further sends the policy obtaining request to the policy control device 104 after receiving a service start request. The policy obtaining request sent by the session management function device 102 to the policy control device 104 carries a user identifier, PDU session information (for example, a type of the PDU session), and the like.

Optionally, the policy control device 104 further determines that information about the IQRM of the user service is to be obtained from the charging processing device 101, and carries an obtaining indication of the IQRM related information of the user service in the request message sent to the charging processing device 101.

Optionally, the policy control device 104 determines, based on configuration information, that the request message is to be sent to the charging processing device 101 and that the IQRM related information is to be obtained. The configuration information is local configuration information of the policy control device 104 or configuration information of the user obtained from a UDR. Alternatively, in response to the policy control device 104 determining that no information related to the IQRM of the user service or the user is stored, the policy control device 104 determines that the information about the IQRM of the user service is to be obtained from the charging processing device 101.

Step 302: The policy control device 104 sends the request message to the charging processing device 101.

Specifically, the request message is used to obtain and subscribe to a current status and a status change of a counter from the charging processing device 101. The request does not carry an obtaining indication of the IQRM.

Further, the request message is further used to obtain the information related to the IQRM of the user or the user service from the charging processing device 101. For example, in step 300, the policy control device 104 determines that information about first IQRM of the user service is to be obtained from the charging processing device 101, and the request message further carries an obtaining indication for the IQRM of the user service. The IQRM obtaining indication is any indication in the following table.

| Indication name | Indication content |
| --- | --- |
| First obtaining indication of the IQRM related information | An identifier of a user and indication information for obtaining a service list of the user in a non-blocking mode |
| Second obtaining indication of the IQRM related information | An identifier of a user service and indication information for obtaining whether the user service is allowed to use the first initial quota request mode in a non-blocking mode; or an identifier of a user and indication information for obtaining whether a service of the user is allowed to use the first initial quota request mode in a non-blocking mode |
| Third obtaining indication of the IQRM related information | An identifier of a user service and indication information for obtaining a first initial quota request mode of the user service, where the first initial quota request mode includes a blocking mode or a non-blocking mode |
| Fourth obtaining indication of the IQRM related information | An identifier of a user and indication information for obtaining a first initial quota request mode of each service of the user, where the first initial quota request mode includes a blocking mode or a non-blocking mode |

In an example, after receiving the policy obtaining request or the policy update request of the user sent by the session management function device 102, the policy control device 104 determines that a service list of services of an NB type of the current user is to be obtained from the charging processing device 101, and sends the first obtaining indication of IQRM related information to the charging processing device 101. The first obtaining indication of the IQRM related information carries the identifier of the user and the indication information for obtaining the service list in the NB mode of the user. The following is an example:

Request:
{
  "UserID": "SUPI",
  "RequestedNBM": true
}

The userID field indicates the user identifier. RequestedNBM is set to true, indicating to obtain a service list of the user whose IQRM is NB.

In another example, after receiving the policy obtaining request or policy update request of the user sent by the session management function device 102, the policy control device 104 determines whether the current user or user service uses the non-blocking mode, and sends a second obtaining indication of the IQRM related information to the charging processing device 101. The second obtaining indication of the IQRM related information carries the identifier of the user service and/or the user identifier, and indication information for obtaining whether the user service or the user is allowed to use the first initial quota request in the non-blocking mode. For example, the request message carries the user identifier and the identifier of the user service, indicating a determination is to be made whether the current user service uses the non-blocking mode. In response to the request message carrying the user identifier but does not carry the identifier of the user service, a determination is to be made whether the current user uses the non-blocking mode.

The following is an example:
Request:
{
  "UserID": "SUPI",
  "NBModeAuth":,
  "Service ID" or "RatingGroup": "1",
  "Service ID" or "RatingGroup": "2"
}

The userID field indicates the user identifier. "InitialQRMMode" indicates that the charging processing device 101 determines whether the user service or user indicated in the request message uses the non-blocking mode. "RatingGroup" indicates a user service corresponding to a rating group. "Service ID" indicates a user service corresponding to an identifier. For example, in response to the request carrying "InitialQRMMode" and "RatingGroup", the charging processing device 101 determines whether the user service corresponding to the rating group uses the non-blocking mode. In response to the request carrying "InitialQRMMode" and "Service ID", the charging processing device 101 confirms whether a service indicated by "Service ID" uses the non-blocking mode. In response to the request message not carrying the "Service ID" and the "RatingGroup", the charging processing device 101 confirms whether a user indicated by "userID" uses the non-blocking mode.

Optionally, after receiving the policy obtaining request or the policy update request of the user sent by the session management function device 102, the policy control device 104 determines that first IQRM related information of the user service is to be obtained, and sends a third obtaining indication of the IQRM related information to the charging processing device 101, to obtain first IQRM information of the user service. The third obtaining indication carries an identifier of the user service and indication information for obtaining a first initial quota request mode of the user service. The first IQRM of the user service includes the blocking mode or the non-blocking mode. The identifier of the user service is a service identifier, a corresponding rating group, or another identifier that identifies the user service. The following is an example:

Request:
{
  "UserID": "SUPI",
  "IntialQRMMAuthorization",
  "Service ID": "XXX"; //"RatingGroup" or "Service ID" is used
}

"IntialQRMMAuthorization" indicates that the charging processing device 101 is to determine whether the user service indicated in the request message uses the non-blocking mode or the blocking mode. The user service indicated in the request message is the user service corresponding to the rating group in "RatingGroup" or the user service corresponding to the user identifier in "Service ID". For example, in response to the request carrying "IntialQRMMAuthorization" and "RatingGroup", the charging processing device 101 determines and returns that IQRM of the user service corresponding to the rating group includes the blocking mode or the non-blocking mode. In response to the request carrying "IntialQRMMAuthorization" and "Service ID", the charging processing device 101 confirms and returns that IQRM of the service indicated by the "Service ID" includes the blocking mode or the non-blocking mode.

In another example, after receiving the policy obtaining request or the policy update request of the user sent by the session management function device 102, the policy control device 104 determines that first IQRM of each service of the user is to be obtained from the charging processing device 101, and sends a fourth obtaining indication of the IQRM related information to the CHF, to obtain the first IQRM related information of each service of the user. The fourth obtaining indication of the IQRM related information carries the user identifier and indication information for obtaining the IQRM of each service of the user. The fourth IQRM obtaining indication is in the following form:
Request:
{
  "UserID": "SUPI",
  "InitialQRMMode": true
}
The userID field indicates the user identifier. "InitialQRMMode" being true indicates that the charging processing device 101 determines a value of an initial quota request mode of each service of the user. The request message indicates that the charging processing device 101 determines whether the first IQRM of each service of the user includes the non-blocking mode or the blocking mode.

Step 304: After receiving the request message, the charging processing device 101 performs corresponding processing based on the request message, and determines the first IQRM related information of the user service.

Specifically, in response to the request message not carrying obtaining indication of information related to the quota management mode (the first IQRM in this embodiment), the charging processing device 101 does not return or actively determines and returns whether the service of the user is allowed to use the non-blocking mode. In response to the charging processing device 101 storing the IQRM information of each service, the charging processing device 101 determines, based on the stored IQRM of each service, whether the user or the user service uses the non-blocking mode. In response to the charging processing device 101 not storing the IQRM information of the service, the charging processing device 101 determines, based on account information and/or a service type of the user, whether the user or the user service uses the non-blocking mode.

Further, in response to the request message carrying obtaining indication of the quota management mode, the charging processing device 101 determines and returns the IQRM related information of the user or the service of the user based on the obtaining indication. The following table shows specific processing.

| Obtaining indication in step 302 | Related processing in step 304 |
|---|---|
| First obtaining indication | The charging processing device 101 obtains, based on the first obtaining indication, a service list of services of the user whose IQRMs are the non-blocking mode and that are indicated by the user identifier. The service list includes identifiers of one or more user services in the non-blocking mode. In response to the charging processing device 101 storing IQRM related information of each service of the user, the charging processing device 101 obtains, based on the stored IQRM related information of each service of the user, the user service whose IQRM includes the non-blocking mode. In response to the charging processing device 101 not storing the IQRM related information of the user service, the charging processing device 101 determines, based on the account information and/or the service type of the user, the user service that uses the non-blocking mode. |
| Second obtaining indication, carrying a user service identifier | The charging processing device 101 determines, based on the identifier of the user service in the second obtaining indication and the indication information indicating whether the user service is allowed to use the first initial quota request mode of the non-blocking mode, whether the user service uses the non-blocking mode. |
| Second obtaining indication, not carrying a user service identifier | The charging processing device 101 determines, based on the identifier of the user in the second obtaining indication and the indication information indicating whether the user is allowed to use the first initial quota request mode of the non-blocking mode, whether a service of the user uses the non-blocking mode. |
| Third obtaining indication | The charging processing device 101 determines, based on the identifier of the user service in the third obtaining indication and the indication information for obtaining the first IQRM of the user service, that the IQRM of the user service includes the non-blocking mode or the blocking mode. |
| Fourth obtaining indication | The charging processing device 101 obtains a first IQRM of each service of the user based on the fourth obtaining indication, where the first IQRM includes the non-blocking mode or the blocking mode. |

Step 306: The charging processing device 104 sends a response message of the request message to the policy control device 101.

Specifically, the response message carries the first IQRM related information of the user or the user service obtained in step 304.

In response to the request message not carrying an obtaining indication of the first quota management mode, the response message carries indication information indicating whether the service of the user is allowed to use the non-blocking mode. In response to the request message carrying the obtaining indication of the first quota management mode, the response message carries IQRM related information corresponding to the obtaining indication.

In response to the charging processing device 101 receiving the obtaining indication of the IQRM related information in step 302, refer to the following table for content carried in the response message.

| Name of the obtaining indication of the IQRM related information | Name and content of the response message of the IQRM related information |
| --- | --- |
| First obtaining indication | A first response message carries the related information of the first quota management mode that includes a list of services of the user that are allowed to use the first initial quota request mode in the non-blocking mode. The service list that uses the first initial quota request mode in the non-blocking mode includes a service identifier of one or more services that use the non-blocking mode, or a rating group of one or more services that use the non-blocking mode. |
| Second obtaining indication | A second response message includes information about whether the user service uses the non-blocking mode. Alternatively, the second IQRM response message includes information about whether a service of the user uses the non-blocking mode, to be specific, whether any online charging service of the user uses the non-blocking mode. |
| Third obtaining indication | A third response message carries the first IQRM of the user service includes the non-blocking mode or the blocking mode. |
| Fourth obtaining indication | A fourth response message carries whether each service of the user is in the non-blocking mode or the blocking mode. |

For the first IQRM response message, refer to the following form:
Response:
{
  "NBMserviceList"
    "RatingGroup" or "ServiceID": 1,
    "RatingGroup" or "ServiceID": 2
  }
}

The "NBMserviceList" indication carries a list of user services that uses the non-blocking mode.

For the second response message, refer to the following form:
Response:
{
  "UserID": "SUPI",
  "NBModeAuthResult": yes;
}

A value of NBModeAuthResult is yes, indicating that any online charging service of the user uses the non-blocking mode.

In response to the second IQRM obtaining indication carrying the rate group or the service identifier, refer to the following form for the second IQRM response message:

Response:
{
  "NBModeAuthResult": {
    "RatingGroup" or "Service ID": "1"
    "ServiceResult": yes;
  }
  "NBModeAuthResult": {
    "RatingGroup" or "Service ID": "2",
    "ServiceResult": no
  }
}

In response to a value of the RatingGroup or the ServiceID being 1 and a value of the ServiceResult being yes, the non-blocking mode is used for a user service whose service ID is 1 or rating group is 1. In response to a value of the RatingGroup or the ServiceID being 2 and a value of the ServiceResult being no, the non-blocking mode is used for a user service whose service ID is 2 or rating group is 2.

For the third response message, refer to the following form:
Response:
{
  "InitialQMMode" {
    "RatingGroup" or "ServiceID": 1,
    "IQRMValue": "NB"
  }
}

A value of "IQRMValue" is "NB", indicating that a first initial quota request mode of the service corresponding to the rating group "RatingGroup" or the service indicated by the service identifier "ServiceID" includes the non-blocking mode.

For the fourth IQRM response message, refer to the following form:
Response:
{
  "InitialQRMMode" {
    "RatingGroup" or "ServiceID": 1,
    "IQRMValue": "NB"
  }
  "InitialQRMMode" {
    "RatingGroup" or "ServiceID": 2,
    "IQRMValue": "B"
  }
}

A value of "IQRMValue" is "NB", indicating that a service corresponding to a rating group "RatingGroup" whose value is 1 or a service indicated by a service identifier whose value is 1 uses the non-blocking mode. A value of "IQRMValue" is "B", indicating that a service corresponding to a rating group "RatingGroup" whose value is 2 or a service indicated by a service identifier whose value is 2 uses the blocking mode.

Step 308: The policy control device 104 determines a first quota management mode of a user service, and generates a first policy of the user service. The first policy indicates whether to perform the first quota management mode on the user service.

Specifically, In response to the charging processing device 101 returning a response message carrying related information of the first IQRM of the user or the user service, the policy control device 104 determines the first quota management mode of the user service based on the related information of the first IQRM of the user or the user service.

Specifically, the policy control device 104 generates the first policy, and the first policy includes the first quota management mode of the user service. The quota management mode herein includes the first initial quota request mode, and the first initial quota request mode includes the blocking mode or the non-blocking mode.

Step 310: The policy control device 104 sends the first policy to the session management function device 102.

Specifically, the policy control device 104 sends the first policy to the session management function device 102, to indicate the session management function device 102 to perform the first quota management mode on the user service.

Specifically, for the control policy sent to the session management function device 102, refer to the following form:
{
  "ChargingRule" {
    "ChargingRuleID": 1,
    "ChargingMethod": "online",
    "RatingGroup": 1; or "ServiceID": 1,
    "sdfHandl": "true"
  }
}

A value of the "sdfHandl" is true, indicating that the IQRM of a service indicated by the service identifier or a service indicated by the rating group includes the blocking mode.

According to at least one embodiment, before delivering the policy, the policy control device 104 obtains the IQRM information of the user service from the charging processing device 101, and sends the IQRM information of the user service in the policy to the session management function device 102. According to at least one embodiment, the IQRM information carried by the policy control device 104 in the policy sent to the session management function device 102 is more accurate, so that a risk in a service use process is avoided.

Figure 3B:
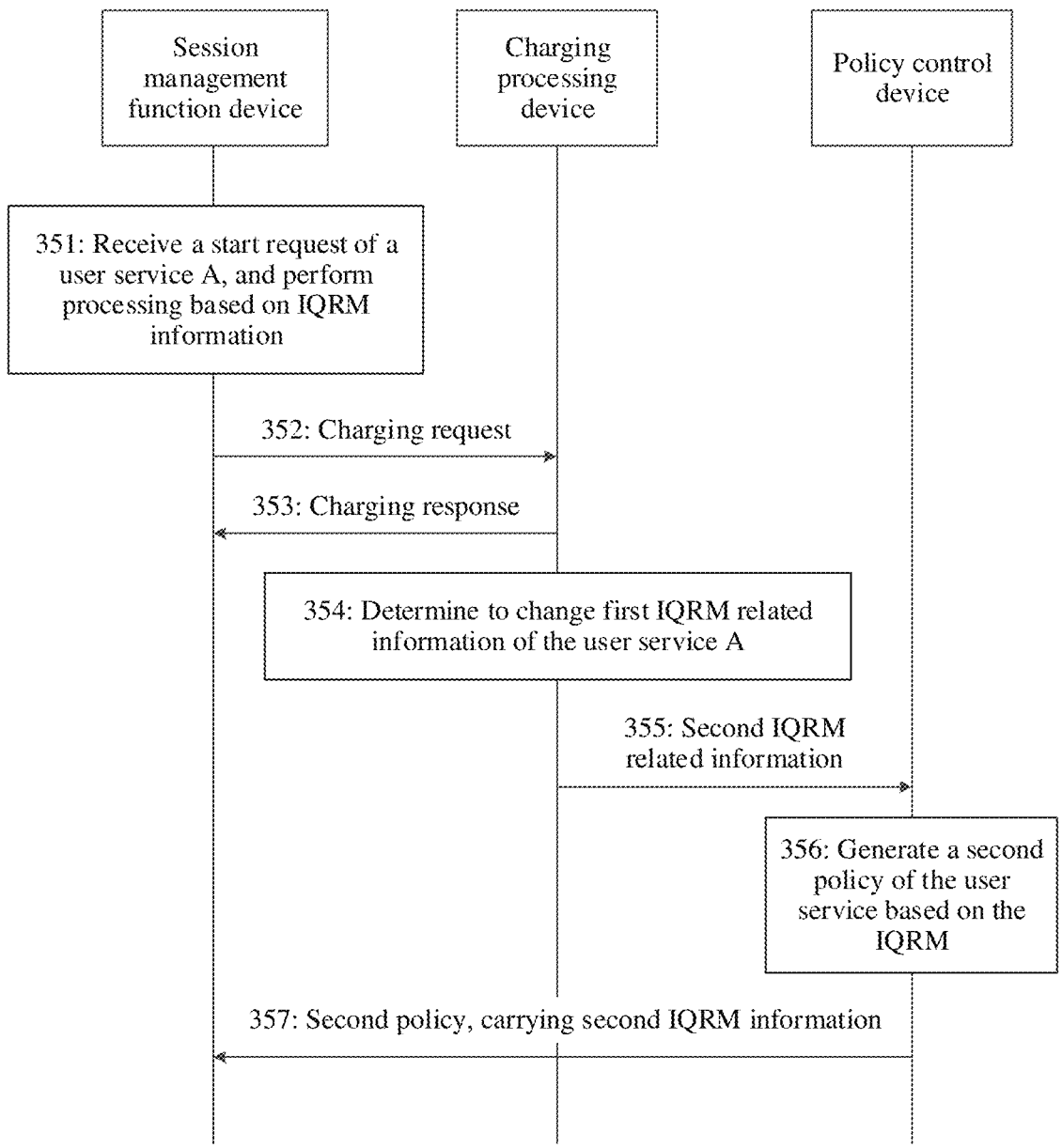
FIG. 3B is a flowchart of a method for determining, by a charging processing device, to change a first quota management mode of a user service according to at least one embodiment.

FIG. 3B is a flowchart of a method for determining, by a charging processing device 101, to change a first quota management mode of a user service according to at least one embodiment. In combination with FIG. 3A, in the method procedure corresponding to FIG. 3B, the first quota management mode is an initial quota request mode (IQRM). For example, the charging processing device 101 makes a real-time decision to change a first IQRM of the user service to the blocking mode, or the charging processing device 101 makes a real-time decision on whether to forbid the user service to use the non-blocking mode. In response to the charging processing device 101 determining to change the first IQRM of the user service to the blocking mode or prohibiting the first IQRM of the service quota management mode of the user service to the non-blocking mode, the charging processing device 101 notifies the policy control device 104, so that the policy control device 104 determines a second quota management mode (a second IQRM in this embodiment) of the user service based on second IQRM related information of the user service, and further determines whether to generate a second policy. The method procedure mainly includes the following steps.

Step 351: The session management function device 102 receives a start request of the user service.

After receiving the service start request, the session management function device 102 determines that information about the first quota management mode (the first IQRM in this embodiment) of the user service (for example, a service A), for example, the first IQRM information of the user service included in step 310 in FIG. 3A, has been obtained. The session management function device 102 performs corresponding processing based on the first IQRM information of the user service. In response to the session management function device 102 determining that the first IQRM information of the service is not obtained, the procedure in FIG. 3A is performed to obtain the IQRM information of the service of the user.

In response to the session management function device 102 determining that the obtained first IQRM information of the service indicates that the IQRM of the user service includes the non-blocking mode, the session management function device 102 first starts the user service, and then sends a quota request to the charging processing device 101 to request a quota for the user service, or sends a quota request to the charging processing device 101 to request a quota for the user service in response to starting the service. In response to the session management function device 102 determining that the obtained first IQRM information of the user service indicates that the IQRM of the user service includes the blocking mode, the session management function device 102 first sends a quota request to the charging processing device 101 to request a quota for the user service, and starts the user service after receiving a quota allocated by the charging processing device 101.

Step 352: The session management function device 102 sends a charging request of the user service to the charging processing device 101.

The charging request is an initial charging request (that is, the first charging request for a user to use a service), or is an update charging request after the initial charging request. This is not limited in at least one embodiment.

In an optional manner, the charging request further carries the first IQRM information of the user service, to indicate an IQRM currently used by the user service (for example, the user service A). In at least one embodiment, an example in which the IQRM of the service A includes the non-blocking mode is used for description. To be specific, the IQRM information of the service A carried in the charging request includes the non-blocking mode.

Step 353: The charging processing device 101 performs corresponding charging processing based on the charging request, and sends a charging response to the session management function device 102.

The foregoing step 351 to step 353 are optional steps. In some scenarios, the foregoing steps are not be performed, and step 354 is directly started. For example, in response to the user service not starting, another user service of the user or a user account management process causes a change of the first quota management mode (herein, the first initial quota request mode) corresponding to the user service.

Step 354: The charging processing device 101 determines that first IQRM related information of the user service A is to be changed.

Specifically, in response to processing the charging request of the user service sent in step 352, or processing a charging request of another service of the user, or performing a charging management process on an account of the user, the charging processing device 101 determines that the first quota management mode of the user service needs to be changed.

For example, that the charging processing device 101 determines that the quota management mode of the user service is to be changed is as follows: The charging processing device 101 determines the first quota management mode currently used by the user service, and determines that the first quota management mode of the user service is to be changed to a second quota management mode.

A method for determining, by the charging processing device 101, that the user service currently uses the first quota management mode is as follows: The charging processing device 101 receives a charging request of the user service, where the charging request includes indication information indicating that the user service currently uses the first quota management mode; and the charging processing device 101 determines, based on the indication information of the first quota management mode of the user service included in the charging request, that the user service currently uses the first quota management mode. Alternatively, the charging processing device 101 determines that related information of the first quota management mode of the user service has been sent to the policy control device 104, and determines, based on the related information of the first quota management mode of the user service that has been sent to the policy control device 104, that the user service currently uses the first quota management mode.

That the charging processing device 101 determines that the first quota management mode of the user service is to be changed to the second quota management mode of the user service is as follows: In response to processing the charging request of the user service sent in step 352, or in response to processing a charging request of another service of the user, or in response to performing a charging management procedure on a user account, the charging processing device 101 determines that a condition for using the first quota management mode by the user service is not met. For example, in response to a balance of the user account not meeting a condition for the service A to use the non-blocking mode, the charging processing device 101 determines to change the IQRM of the service A to the blocking mode, or forbids the service A to use the non-blocking mode. The condition for the user service to use the non-blocking mode is as follows: A package balance of the user account is greater than a first threshold, or a decrease speed of the balance of the user account is lower than a second threshold, or the like.

Further, in response to determining to change the non-blocking mode of the user service A to the blocking mode, the charging processing device 101 further determines to change the non-blocking mode of another service of the user to the blocking mode, or determine to forbid another service of the user to use the non-blocking mode.

Optionally, after determining to change the IQRM related information of the user service, the charging processing device 101 saves a determining result, that is, saves the determined second quota management mode of the user service, to provide the IQRM information to a requesting device in response to another device subsequently obtaining the IQRM information of the user service.

Step 355: The charging processing device 101 sends, to the policy control device 104, related information of a second IQRM of the user service that is for changing the first IQRM.

Specifically, the charging processing device 101 sends a notification message (also referred to as a change notification) to the policy control device 104, where the notification message carries related information of the second quota management mode of the user service, namely, related information of the second IQRM of the user service.

The charging processing device 101 determines that a resource created by the policy control device 104 for the user exists, and sends the notification message to the policy control device 104 based on a notification address corresponding to the resource. The resource created for the user is a resource that the policy control device 104 requests the charging processing device 101 to create for the user. The resource created for the user is used by the policy control device to obtain (subscribe to) accumulative status information of the user. The resource created for the user is created by the charging processing device based on a resource creation request after the policy control device sends the resource creation request to the charging processing device. The resource creation request carries a notification address and a user identifier that correspond to the resource. The notification address is used by the charging processing device 101 to notify the policy control device 104 of the accumulative status information of the user. Based on the determined existing resource requested to be created for the user, the charging processing device 101 determines that a notification message of the second IQRM related information of the user service is to be sent to the policy control device 104. Alternatively, in response to the charging processing device 101 determining, based on the determined existing resource (or subscription information) requested to be created for the user, that the policy control device 104 has subscribed to or requested the first IQRM related information of the user, the charging processing device 101 determines that a notification message of the second IQRM related information of the user service is to be sent to the policy control device 104.

For the second IQRM related information of the user service carried in the notification message, refer to the following table.

| | |
|---|---|
| First notification | A list of services of the user that are allowed to use the second IQRM in the non-blocking mode |
| Second notification | Indication information indicating whether the user is allowed to use the second IQRM in the non-blocking mode |
| Third notification | Indication information indicating whether the user service is allowed to use the second IQRM in the non-blocking mode |
| Fourth notification | Indication information indicating that the second IQRM of the user service includes the blocking mode or the non-blocking mode |
| Fifth notification | Indication information indicating that a second IQRM of each service of the user includes the blocking mode or the non-blocking mode |

A notification message including the first notification is referred to as a first notification message, and the rest is deduced by analogy. The following is a reference example of the second notification message:

Notify:
{
  "UserID": "SUPI",
  "NBModeAuthResult": No;
}

The userID field indicates the user identifier. In response to the value of "NBModeAuthResult" being no, the charging processing device 101 confirms that the user cannot use the non-blocking mode, to be specific, all services of the user cannot use the non-blocking mode.

A reference example of another notification message, for example, the second notification message, the third notification message, the fourth notification message, or the fifth notification message, is not provided herein in at least one embodiment.

Step 356: After receiving the related information of the second quota management mode of the user service sent by the charging processing device 101, the policy control device 104 determines the second quota management mode of the user service based on the related information of the second quota management mode, and generates a second policy of the user service.

The second policy is for updating or replacing the first policy, and indicates whether to perform the second quota management mode on the user service.

That the second policy updates the first policy is specifically as follows: The generated second policy includes a policy identifier that is the same as an identifier of the first policy, and is determined, based on the identifier, that the second policy is for updating the first policy.

That the second policy replaces the first policy is specifically as follows: A second policy identifier is allocated to the second policy, where the second policy is a new policy of a user service different from the first policy, and the policy control device 104 is to first deactivate the first policy, and then activate the second policy.

Step 357: The policy control device 104 sends the second policy to the session management function device 102, where the second policy carries second IQRM information.

Specifically, in response to the second policy including a policy identifier that is the same as the identifier of the first policy, a policy update message delivered by the policy control device 104 to the session management function carries the second policy to update the first policy of the user service.

In response to the second policy being the new policy of the user service, the policy update message delivered by the policy control device 104 to the session management function carries a deactivation instruction of the first policy and an activation instruction of the second policy, to update the first policy of the user service using the second policy.

According to at least one embodiment, the charging processing device 101 determines or change the first IQRM of the user service based on information such as user account information. Therefore, the IQRM of the user service is more accurate, and risks and losses caused by the use of the non-blocking mode in the user service is avoided.

In an actual service use process, FIG. 3B is used in combination with FIG. 3A, or is used separately. This is not limited in embodiments described herein.

Figure 4:
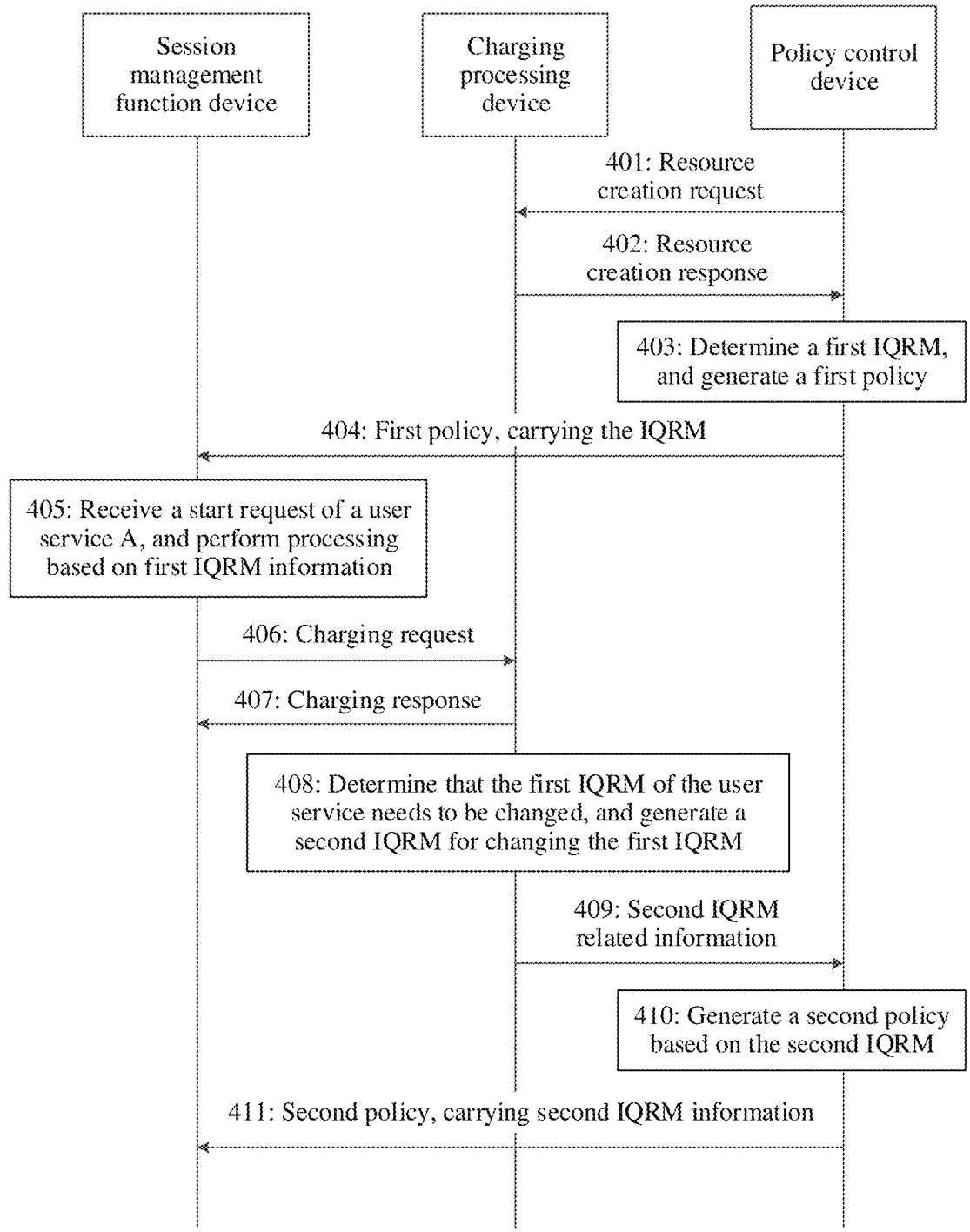
FIG. 4 is a flowchart of a method for determining a first quota management mode and a second quota management mode of a user service according to at least one embodiment.

FIG. 4 is a flowchart of a method for determining a first quota management mode and a second quota management mode of a user service according to at least one embodiment. In this embodiment, the quota management mode is an initial quota request mode (IQRM). Different from the embodiments corresponding to FIG. 3A and FIG. 3B, in this embodiment, the policy control device 104 determines the first quota management mode of the user service based on the obtained configuration information of the user, that is, determines whether the user service uses the non-blocking mode. The charging processing device 101 decides in real time whether to change the first quota management mode of the user service to the second quota management mode. The method procedure mainly includes the following steps.

Step 401 and 402: The policy control device 104 sends a resource creation request to the charging processing device 101, and receives a resource creation response of the charging processing device 101.

After receiving a policy obtaining indication of the user service or a policy update request of the user service that is sent by a session management function device 102, the policy control device 104 sends the resource creation request to the charging processing device 101 in response to the policy obtaining indication or the policy update request, to obtain related information of the user service or the user, such as usage information of the user service, from the charging processing device 101 by using the created resource. The resource creation request is alternatively a session establishment request, to establish a session between the policy control device 104 and the charging processing device 101.

Step 403: The policy control device 104 determines a first quota management mode (first IQRM in at least one embodiment) of the user service based on the obtained information, and generates a first policy of the user service based on the determined first IQRM of the user service. The generated first policy of the user service includes first IQRM information of the user service.

For example, the policy control device 104 obtains the configuration information of the user from the charging processing device 101 or another network device such as a (UDR), and determine the IQRM of the user service based on the obtained configuration information of the user. For example, the policy control device 104 determines the first IQRM of the user service based on the user account information and/or the usage information of the user service obtained from the charging processing device 101, and the policy control device 104 further determines the first IQRM based on user information obtained from the UDR, such as whether the IQRM subscribed to by the user includes the non-blocking mode.

Step 404: The policy control device 104 sends the generated first policy of the user service to the session management function device 102.

For specific descriptions of step 404, refer to the descriptions of step 310. Details are not described again in embodiments described herein.

Step 405: The session management function device 102 receives a start request of the user service, and performs processing based on the first IQRM. The start request of the user service carries a service identifier and a user identifier.

Specifically, for descriptions of step 405, refer to the descriptions of step 351. Details are not described again in embodiments described herein.

Step 406: The session management function device 102 sends a charging request to the charging processing device 101, where the charging request is a charging request for the user service, or is a charging request for another service used by the user. In addition, the charging request is an initial charging request (that is, the first charging request for a user to use a service), or is an update charging request after the initial charging request. This is not limited in embodiments described herein.

Further, the charging request carries the first IQRM information of the user service, to indicate an IQRM currently used by the user service (for example, a service B). In at least one embodiment, an example in which the first IQRM of the user service includes the non-blocking mode is used for description. To be specific, the IQRM information of the user service B carried in the charging request includes the non-blocking mode. In this situation, the IQRM information indicates that before receiving a quota allocated by the charging processing device 101, the session management function device 102 allows a data flow related to the user service B to pass.

Step 407: The charging processing device 101 performs corresponding charging processing based on the charging request, and then sends a charging response to the session management function device 102.

Step 408: The charging processing device 101 determines that the first IQRM of the user service is to be changed, generates a second IQRM for changing the first IQRM, and saves information of the changed second IQRM.

Specifically, in a process of performing step 407, the charging processing device 101 determines, based on the first IQRM information of the user service carried in the charging request, that the user service uses the non-blocking mode. in response to determining that the user account does not meet a condition for the user service to use the non-blocking mode, the charging processing device 101 determines that the second quota management mode (the second IQRM in this embodiment) of the user service includes the blocking mode, or forbids the user service to use the non-blocking mode. The condition for the user service to use the non-blocking mode is as follows: A package balance of the user account is greater than a first threshold, or a decrease speed of the balance of the user account is lower than a second threshold, or the like.

Further, in response to determining to change the non-blocking mode of the user service to the blocking mode, the charging processing device 101 further determines to change the non-blocking mode of another service of the user to the blocking mode, or determine to forbid another service of the user to use the non-blocking mode, or forbid all services of the user to use the non-blocking mode.

There is no time sequence between step 407 and step 408.

Step 409: The charging processing device 101 sends a notification message (also referred to as a change notification) of changing the first IQRM related information of the user service to the policy control device 104, so that the policy control device 104 generates or updates the control policy of the user service based on the change notification.

Specifically, descriptions of step 409 are consistent with the descriptions of step 355. Details are not described herein again in embodiments described herein.

Descriptions of steps 410 and 411 are consistent with descriptions of steps 356 and 357. Details are not described again in embodiments described herein.

According to at least one embodiment, the policy control device 104 determines, based on the obtained related information of the user, whether the user service uses the non-blocking mode. In addition, in the process of using the user service, the IQRM of the user service is determined or changed based on the account information of the user. Therefore, the IQRM of the user service is more accurate, and risks and losses caused by the use of the non-blocking mode in the process of using the user service is avoided.

Figure 5A:
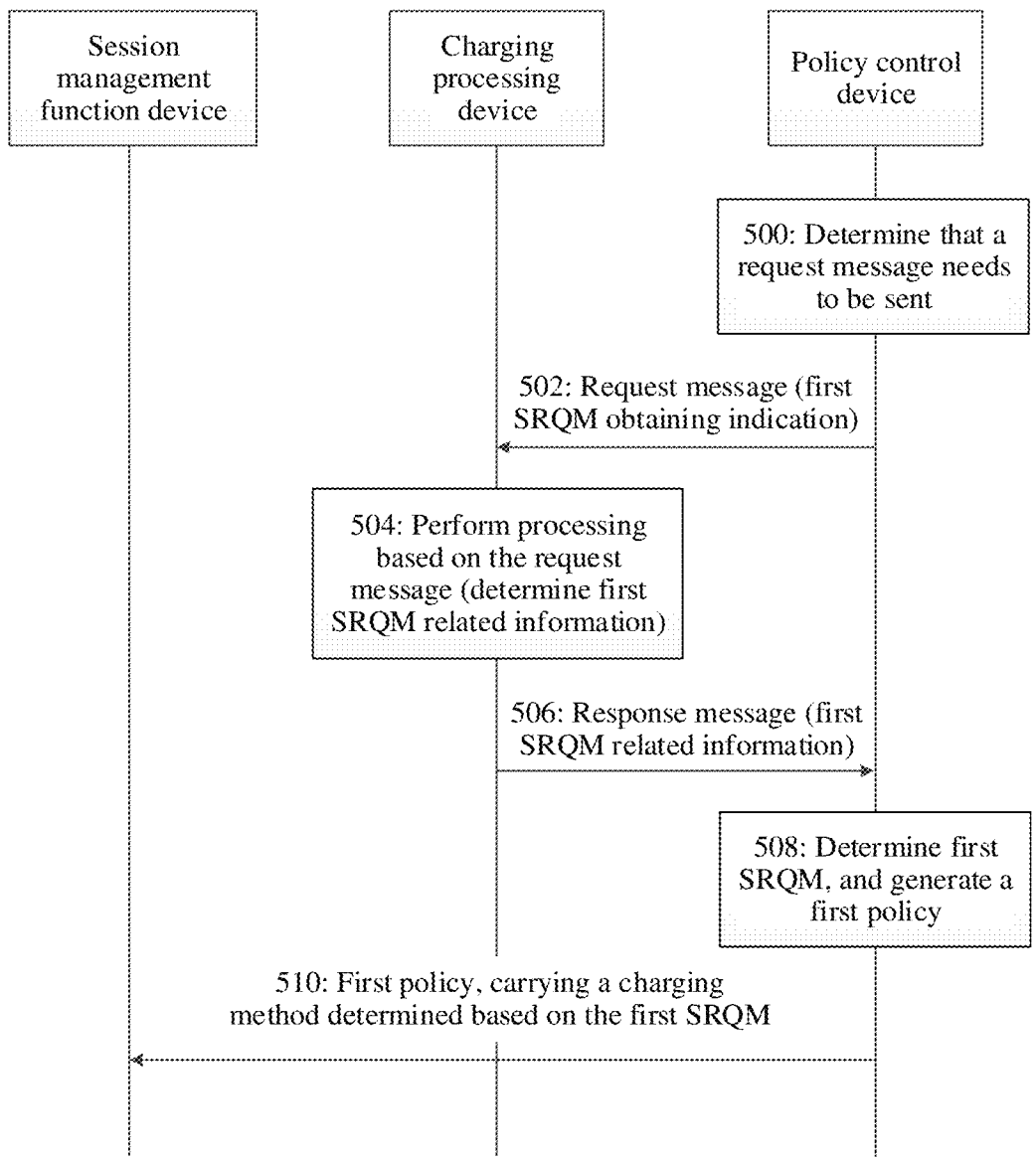
FIG. 5A is a flowchart of another method for determining a first quota management mode of a user service by a policy control device according to at least one embodiment.

FIG. 5A is a flowchart of a method for determining a policy by the policy control device 104 according to at least one embodiment. In the method procedure corresponding to FIG. 5A, the quota management mode is suspend or resume quota management (SRQM). The policy control device 104 receives related information of a quota management mode of a user or a user service from the charging processing device 101, further determines whether to suspend or resume quota management of the user service, and generates a policy accordingly. The method procedure mainly includes the following steps.

Step 500: The policy control device 104 determines that a request message is to be sent to the charging processing device 101.

Specifically, after receiving a policy obtaining request of the user service or a policy update request of the user service that is sent by a session management function device 102, the policy control device 104 determines, in response to the policy obtaining request or the policy update request, that information is to be obtained from the charging processing device 101, and determine to send a request message to the charging processing device 101. Generally, in response to receiving a request for establishing a PDU session for a user, the session management function device 102 sends a policy obtaining request to the policy control device 104. The session management function device 102 further sends the policy obtaining request to the policy control device 104 after receiving a service start request. The policy obtaining request sent by the session management function device 102 to the policy control device 104 carries a user identifier, PDU session information (for example, a type of the PDU session), and the like.

Optionally, the policy control device 104 further determines whether information about the SRQM of the service of the user is to be obtained from the charging processing device 101. In response to the information about the SRQM of the service of the user is to be obtained from the charging processing device 101, the policy control device 104 carries an obtaining indication of the SRQM related information of the service of the user in the request message sent to the charging processing device 101.

Optionally, the policy control device 104 determines, based on configuration information, that the request message is to be sent to the charging processing device 101 and that the SRQM related information of the user service is to be obtained. The configuration information is local configuration information of the policy control device 104 or configuration information of the user obtained from a UDR.

Step 502: The policy control device 104 sends the request message to the charging processing device 101.

Specifically, the request message is used to obtain and subscribe to a current status and a status change of a counter from the charging processing device 101, and the request does not carry an instruction for obtaining the SRQM.

Further, the request message is further used to obtain the information related to the SRQM of the user or the user service from the charging processing device 101. For example, in step 500, the policy control device 104 determines that information about the SRQM of the user service is to be obtained from the charging processing device 101, and the request message further carries an obtaining indication for the SRQM of the user service. The SRQM obtaining indication is any indication in the following table.

| Indication name | Indication content |
|---|---|
| First obtaining indication of the SRQM related information | Indication information for obtaining a list of services of a user whose quota management is suspended |
| Second obtaining indication of the SRQM related information | Indication information for obtaining whether quota management of the user or the user service is allowed to be suspended |
| Third obtaining indication of the SRQM related information | Indication information for obtaining SRQM information of a specified user service, where the SRQM is Suspend, indicating that the user service uses a temporarily suspend quota management mode; or the SRQM is Resume, indicating that quota management is resumed for the user service, to be specific, the session management function device 102 is to request a quota for the user service. |
| Fourth obtaining indication of the SRQM related information | Indication information for obtaining SRQM information of services of the user, where the SRQM is Suspend, indicating that the user service uses a temporarily suspend quota management mode; or the SRQM is Resume, indicating that quota management is resumed for the user service, to be specific, the session management function device 102 is to request a quota for the user service. |

Specifically, a method for carrying any one of the first to the fourth obtaining indications in the request message sent by the policy control device 104 to the charging processing device 101 is similar to the method for carrying the first to the fourth corresponding obtaining indications in step 302 of the embodiment shown in FIG. 3A. Details are not described again in embodiments described herein.

Step 504: After receiving the request message, the charging processing device 101 performs corresponding processing based on the request message. For example, the charging processing device 101 determines the first SRQM related information of the user service.

Specifically, in response to the request message not carrying obtaining indication of information related to the quota management mode (the first SRQM in this embodiment), the charging processing device 101 actively determines and return whether the quota management of the user is suspended. In response to the charging processing device 101 storing the SRQM information of each service, the charging processing device 101 determines, based on the stored SRQM information of each service, whether the user or the user service suspends quota management. In response to the charging processing device 101 not storing the SRQM information of the service, the charging processing device 101 determines, based on account information and/or a service type of the user, whether the user or the user service uses the non-blocking mode.

Further, in response to the request message carrying obtaining indication of the quota management mode, the charging processing device 101 determines and returns the SRQM related information of the user or the user service based on the obtaining indication. The following table shows specific processing.

| Obtaining indication in step 502 | Related processing in step 504 |
|---|---|
| First obtaining indication | Determine, based on the first obtaining indication, a list of services of the user that allow suspend quota management |
| Second obtaining indication, carrying a user service identifier | Determine, based on the identifier of the user service and the indication information indicating whether the quota management of the user service is suspended, whether the user service allows suspend quota management |
| Second obtaining indication, not carrying a user service identifier | Determine, based on the identifier of the user and the indication information indicating whether the quota management of the service of the user is suspended, whether the service of the user allows suspend quota management |
| Third obtaining indication | Determine, based on the user service identifier in the third obtaining indication and the indication information for obtaining the first SRQM of the user service, whether the first SRQM of the user service is suspend (suspend) or resume (resume) quota management |
| Fourth obtaining indication | Determine first SRQM of each service of the user based on the user identifier in the fourth obtaining indication, where the first SRQM includes suspend quota management or resume quota management |

A specific method is similar to step 304 in the embodiment shown in FIG. 3A, and details are not described herein again.

Step 506: The charging processing device 104 sends a response message of the request message to the policy control device 101.

Specifically, the response message carries the first SRQM related information of the user or the user service obtained in step 504.

In response to the request message not carrying an obtaining indication of the quota management mode, the response message carries indication information indicating whether the first quota management mode of the service of the user is allowed to be suspended.

In response to the request message carrying the obtaining indication (such as any obtaining indication in the first obtaining indication to the fourth obtaining indication) of the quota management mode, the response message carries first SRQM related information corresponding to the obtaining indication.

Specific examples of the method and the message are similar to those in step 306 in the embodiment shown in FIG. 3A, and details are not described herein again.

Step 508: The policy control device 104 determines a first quota management mode of a user service, and generates a first policy of the user service. The first policy indicates whether to perform the first quota management mode on the user service.

Specifically, in response to the charging processing device 101 returning a response message carrying related information of the first SRQM of the user or the user service, the policy control device 104 determines the first quota management mode of the user service based on the related information of the first SRQM of the user or the user service. The quota management mode herein is suspend or resume quota management.

Specifically, the policy control device 104 generates the first policy. In response to the determined first quota management mode of the user service being suspend quota management, a charging method of the user service included in the first policy is offline charging or temporary offline charging. In response to the determined first quota management mode of the user service being resume quota management, the charging method of the user service included in the first policy is online charging.

Step 510: The policy control device 104 sends the first policy to the session management function device 102.

Specifically, the policy control device 104 sends the first policy to the session management function device 102, to indicate the session management function device 102 to perform the first quota management mode on the user service.

Specifically, for the control policy sent to the session management function device 102, refer to the following form:
{
 "ChargingRule" {
  "ChargingRuleID": 1,
  "ChargingMethod": "TempOffline",
  "RatingGroup": 1; or "ServiceID": 1
 }
}

A value of "ChargingMethod" is TempOffline, indicating that the quota management of the user service is suspended.

According to at least one embodiment, before delivering the policy, the policy control device 104 obtains the first SRQM related information of the user service from the charging processing device 101, generates the first policy of the user service based on the first SRQM related information, and sends the first policy to the session management function device 102. According to at least one embodiment, the policy control device 104 determines, before sending the first policy to the session management function device 102, the charging method based on the decision of the charging processing device 101. This reduces charging processing load, improve efficiency of an entire system, and avoid credit control risks in a service use process.

Figure 5B:
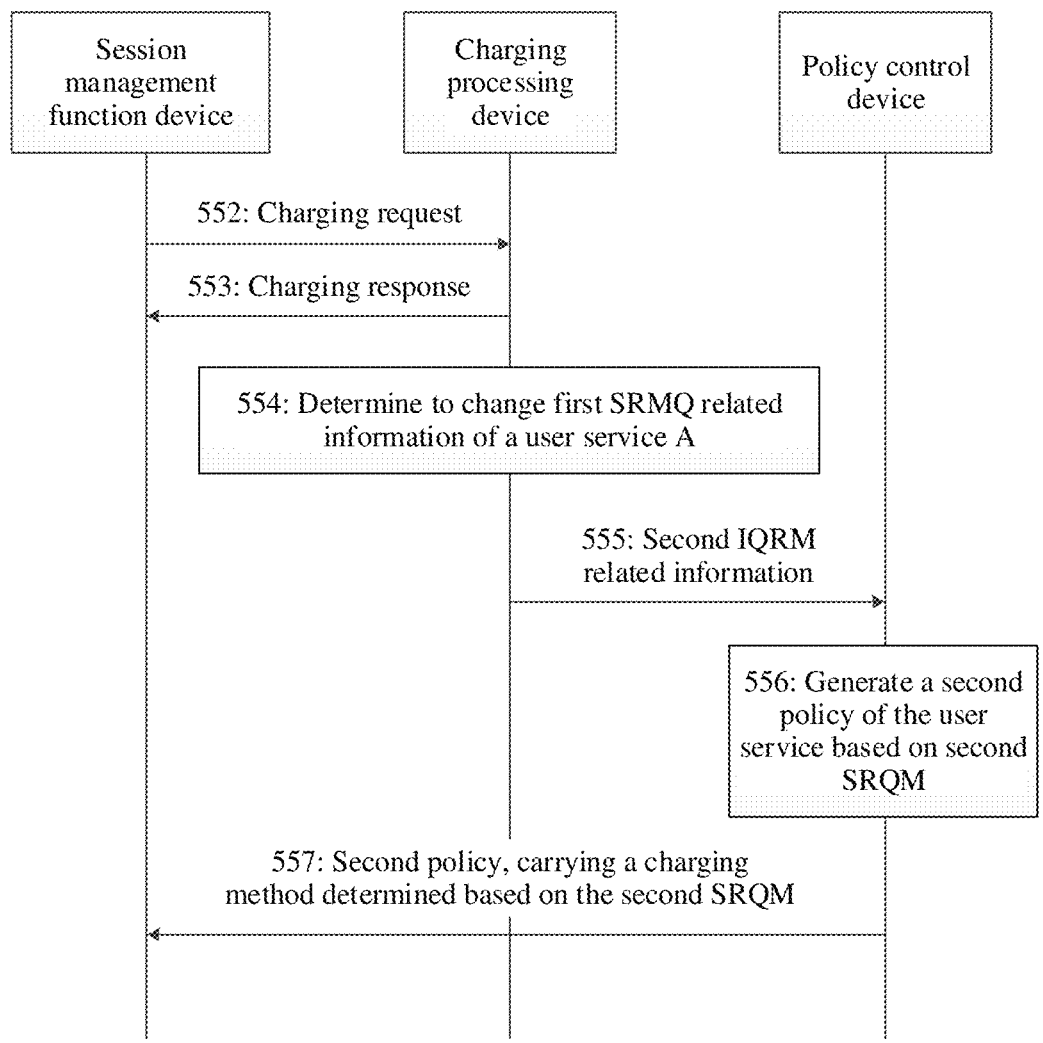
FIG. 5B is a flowchart of another method for determining, by a charging processing device, to change a first quota management mode of a user service according to at least one embodiment.

FIG. 5B is a flowchart of a method for determining, by the charging processing device 101, to change a quota management mode of a user service according to at least one embodiment. In combination with FIG. 5A, in the method procedure corresponding to FIG. 5B, the quota management mode is suspend or resume quota management (SRQM). The policy control device 104 receives, from the charging processing device 101, related information of second SRQM for changing the first SRQM, determines, based on the related information of the second SRQM, whether to suspend or enable quota management of the user service, and determines whether to update/replace the previously generated first policy of the user service. The method procedure mainly includes the following steps.

Step 552: The session management function device 102 sends a charging request of the user service to the charging processing device 101 in a process of using the user service.

The charging request is an initial charging request (that is, the first charging request for a user to use a service), or is an update charging request after the initial charging request. This is not limited in embodiments described herein.

In an optional manner, the charging request further carries SRQM information (temporary suspension is used as an example) corresponding to the service, to indicate that quota management is currently suspended for the service (for example, the service A).

Before performing this step, the session management function device 102 receives a start request of the user service, and determines that information about the first quota management mode (the first SRQM in this embodiment) of the user service (for example, the service A), for example, the first SRQM information of the user service included in step 510 in FIG. 5A, has been obtained. The session management function device 102 performs corresponding processing based on the first SRQM information of the user service. In response to the session management function device 102 determining that the first IQRM information of the service is not obtained, the procedure in FIG. 5A is performed to obtain the first SRQM information of the service of the user.

in response to the session management function device 102 determining that the obtained first SRQM information of the service indicates that the SRQM of the user service is suspend quota management, the session management function device 102 starts the user service, and does not obtain a quota from the charging processing device 101. in response to the session management function device 102 determining that the obtained first SRQM information of the user service indicates that the SRQM of the user service includes resume quota management, the session management function device 102 first sends a quota request to the charging processing device 101 to request a quota for the user service, and starts the user service after receiving a quota allocated by the charging processing device 101. Alternatively, in response to the session management function device 102 determining that the obtained first SRQM information of the user service indicates that the SRQM of the user service includes resume quota management, the session management function device 102 first starts the service, and then sends a quota request to the charging processing device 101 to request a quota for the user service, or sends a quota request to the charging processing device 101 to request a quota for the user service in response to starting the service. In response to the session management function device 102 determining that the obtained first SRQM information of the user service indicates that the SRQM of the user service includes resume quota management, the session management function device 102 further uses a first initial quota request mode in the blocking mode or the non-blocking mode. For details, refer to the foregoing embodiment.

Step 553: The charging processing device 101 performs corresponding charging processing based on the charging request, and sends a charging response to the session management function device 102.

The foregoing step 552 and step 553 are optional steps. In some scenarios, the foregoing steps are not performed, and step 554 is directly started. For example, in response to the user service not starting, another user service of the user or a user account management process causes a change of the quota management mode (herein, suspend or resume quota management) corresponding to the user service.

Step 554: The charging processing device 101 determines that first SRQM related information of the user service A is to be changed.

In response to processing the charging request of the user service sent in step 552, or processing a charging request of another service of the user, or performing a charging management process on an account of the user, the charging processing device 101 determines whether the first quota management mode of the user service is to be changed.

For example, that the charging processing device 101 determines that the quota management mode of the user service is to be changed is as follows: The charging processing device 101 determines the first quota management mode of the user service, and determines that the first quota management mode of the user service is to be changed to a second quota management mode.

A method for determining, by the charging processing device 101, that the user service currently uses the first quota management mode is as follows: The charging processing device 101 receives a charging request of the user service, where the charging request includes indication information indicating that the user service currently uses the first quota management mode; and the charging processing device 101 determines, based on the indication information of the first quota management mode of the user service included in the charging request, that the user service currently uses the first quota management mode. Alternatively, the charging processing device 101 determines that related information of the first quota management mode of the user service has been sent to the policy control device 104, and determines, based on the related information of the first quota management mode of the user service that has been sent to the policy control device 104, that the user service currently uses the first quota management mode.

That the charging processing device 101 determines that the first quota management mode of the user service is to be changed to the second quota management mode of the user service is as follows: In response to processing the charging request of the user service sent in step 552, or in response to processing a charging request of another service of the user, or in response to performing a charging management procedure on a user account, a condition for the user service to use the first quota management mode is not met. For example: in response to an account balance of the user not meeting the condition for the service A to use suspend quota management, the charging processing device 101 determines to change the SRQM of the service A to resume quota management.

Further, in response to determining to change suspend quota management of the user service A to resume quota management, the charging processing device 101 further determines to change suspend quota management of another service of the user to resume quota management, or determine to forbid another service of the user to use suspend quota management.

Optionally, after determining to change the first SRQM related information of the user service, the charging processing device 101 saves a determining result, that is, saves the determined second quota management mode used by the user service, to provide the SRQM information to a requesting device in response to another device subsequently obtaining the SRQM information of the user service.

Step 555: The charging processing device 101 sends, to the policy control device 104, related information of second SRQM of the user service that is for changing the first SRQM.

Specifically, the charging processing device 101 sends a notification message (also referred to as a change notification) to the policy control device 104, where the notification message carries related information of the second quota management mode of the user service, namely, related information of the second SRQM of the user service.

The charging processing device 101 determines that a resource created by the policy control device 104 for the user exists, and sends the notification message to the policy control device 104 based on a notification address corresponding to the resource. The resource created for the user is a resource that the policy control device 104 requests the charging processing device 101 to create for the user. The resource created for the user is used by the policy control device to obtain (subscribe to) accumulative status information of the user. The resource created for the user is created by the charging processing device based on a resource creation request after the policy control device sends the resource creation request to the charging processing device. The resource creation request carries a notification address and a user identifier that correspond to the resource. The notification address is used by the charging processing device 101 to notify the policy control device 104 of the accumulative status information of the user. Based on the determined existing resource requested to be created for the user, the charging processing device 101 determines that a notification message of the second SRQM related information of the user service is to be sent to the policy control device 104. Alternatively, in response to the charging processing device 101 determining, based on the determined existing resource (or subscription information) requested to be created for the user, that the policy control device 104 has subscribed to or requested the first SRQM related information of the user, the charging processing device 101 determines that a notification message of the second SRQM related information of the user service is to be sent to the policy control device 104.

For the second SRQM related information of the user service carried in the notification message, refer to the following table.

| First notification | A service list that allows suspend quota management and that is of the user |
|---|---|
| Second notification | Indication information indicating whether quota management of the user service is allowed to be suspended |
| Third notification | Second SRQM indication information indicating whether quota management of the service of the user is allowed to be suspended |

| | |
|---|---|
| Fourth notification | Indication information indicating whether the second SRQM of the user service includes suspend quota management or resume quota management |
| Fifth notification | Indication information indicating whether second SRQM of each service of the user includes suspend quota management or resume quota management |

A notification message including the first notification is referred to as a first notification message, and the rest is deduced by analogy. The following is a reference example of the third notification message:

Notify:
{
　"UserID": "SUPI";
　"SRQMode": "RESUME";
}

The userID field indicates the user identifier. A value of "SRQMode" is "RESUME", indicating that the charging processing device 101 confirms that the service of the user does not allow suspend quota management, to be specific, all services of the user do not allow suspend quota management. In response to the notification message further carrying a user identifier, for example, service id or Rating group, the notification message is a second notification message that indicates the user service indicated by the service id or Rating group does not allow suspend quota management. Further, in response to the second SRQM related information in the notification message being resume quota management, the notification message further carries IQRM information, to indicate that the user service uses the blocking mode or the non-blocking mode.

A reference example of another notification message, for example, the first notification message, the fourth notification message, or the fifth notification message, is not provided herein in embodiments described herein.

Step 556: After receiving the related information of the second quota management mode of the user service sent by the charging processing device 101, the policy control device 104 determines the second quota management mode of the user service based on the related information of the second quota management mode, and generates a second policy of the user service.

The second policy is for updating or replacing the first policy, and indicates whether to perform the second quota management mode on the user service.

That the second policy updates the first policy is specifically as follows: The generated second policy includes a policy identifier that is the same as an identifier of the first policy, and a determination is made, based on the identifier, that the second policy is for updating the first policy.

That the second policy replaces the first policy is specifically as follows: A unique policy identifier is allocated to the second policy, where the second policy is a new policy of a user service different from the first policy, and the policy control device 104 first deactivates the first policy, and then install and activate the second policy.

Before generating the second policy, the policy control device 104 determines that changing the SRQM of the user service to the second quota management mode affects the first policy.

Step 557: The policy control device 104 sends the second policy to the session management function device 102.

Specifically, in response to the second policy including a policy identifier that is the same as the identifier of the first policy, a policy update message delivered by the policy control device 104 to the session management function carries the second policy to update the first policy of the user service.

In response to the second policy being the new policy of the user service, the policy update message delivered by the policy control device 104 to the session management function carries a deactivation instruction of the first policy and an activation instruction of the second policy, to update the first policy of the user service using the second policy.

According to at least one embodiment, the charging processing device 101 determines or changes the SRQM of the user service based on information such as user account information. In this way, SRQM control of the user service is more accurate, and risks and losses caused by suspend quota management in a process of using the user service is avoided.

In an actual service use process, FIG. 5A is used in combination with FIG. 5B, or is used separately. This is not limited in embodiments described herein.

Figure 6:
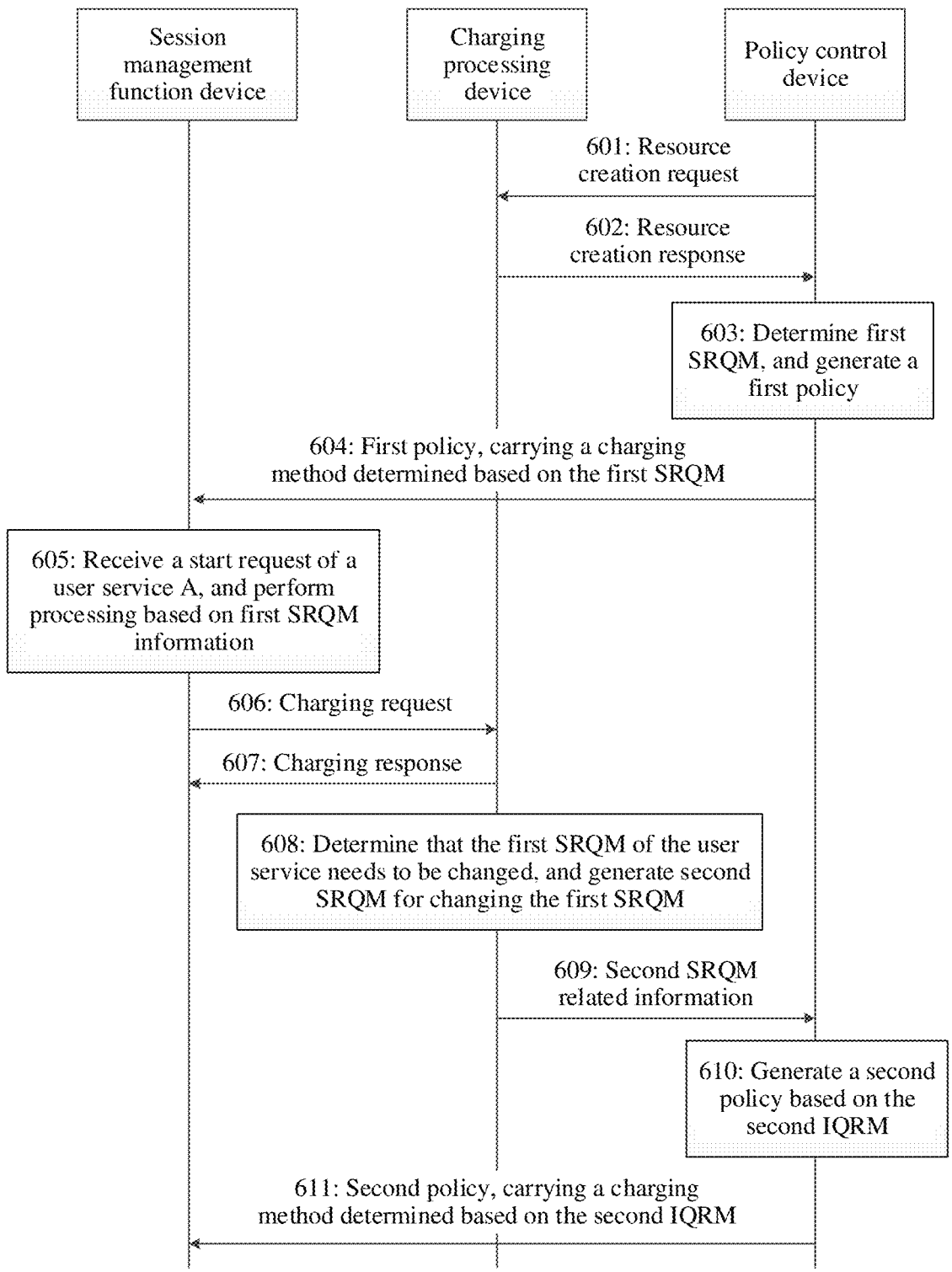
FIG. 6 is a flowchart of another method for determining a first quota management mode and a second quota management mode of a user service according to at least one embodiment.

FIG. 6 is a flowchart of another method for determining a quota management mode of a user service according to at least one embodiment. In this embodiment, the quota management mode is suspend/resume quota management (SRQM). Different from the embodiments corresponding to FIG. 5A and FIG. 5B, in this embodiment, the policy control device 104 determines the first quota management mode of the user service based on the obtained configuration information of the user, that is, determines whether the user service allows suspend quota management. The charging processing device 101 decides in real time whether to change the first quota management mode of the user service to the second quota management mode. The method procedure mainly includes the following steps.

Step 601 and 602: The policy control device 104 sends a resource creation request to the charging processing device 101, and receives a resource creation response of the charging processing device 101.

In this embodiment, descriptions of steps 601 and 602 are the same as descriptions of steps 401 and 402, and therefore details are not described again.

Step 603: The policy control device 104 determines a first quota management mode (first SRQM in at least one embodiment) of the user service based on the obtained information, and generates a first policy of the user service. The first policy indicates whether to perform the first quota management mode on the user service. For example, the policy control device 104 obtains the configuration information of the user from the charging processing device 101 or another network device such as a (UDR), and determine the first SRQM of the user service based on the obtained configuration information of the user. For example, the policy control device 104 determines the first SRQM of the user service based on the user account information and/or the usage information of the user service obtained from the charging processing device 101, and the policy control device 104 further determines the first SRQM of the user service based on user information obtained from the UDR, such as the SRQM subscribed to by the user.

The first policy generated by the policy control device 104 in step 603 is the same as the first policy generated in step 508. Details are not described herein again in embodiments described herein.

Step 604: The policy control device 104 sends the generated first policy of the user service to the session management function device 102.

For specific descriptions of step 604, refer to the descriptions of step 510. Details are not described again in embodiments described herein.

Step 605: The session management function device 102 receives a start request of the user service, where the user service carries a service identifier and a user identifier.

Specifically, for descriptions of step 605, refer to the descriptions of step 351. Details are not described again in embodiments described herein. Optionally, in at least one embodiment, step 606 is performed without performing step 605. Alternatively, step 605 is performed before step 601. This is not limited in embodiments described herein.

Step 606: The session management function device 102 sends a charging request to the charging processing device 101, where the charging request is a charging request for the user service, or is a charging request for another service used by the user. In addition, the charging request is an initial charging request (that is, the first charging request for a user to use a service), or is an update charging request after the initial charging request. This is not limited in embodiments described herein.

Further, the charging request carries the first SRQM information of the user service, to indicate an SRQM currently used by the user service (for example, a service B). In at least one embodiment, an example in which the first SRQM of the user service includes suspend quota management is used for description. To be specific, the first SRQM information of the user service B carried in the charging request is suspend quota management indicates that the session management function device 102 does not request the charging processing device 101 for a quota in a service execution process, and allows a data flow related to the user service B to pass.

Step 607: The charging processing device 101 performs corresponding charging processing based on the charging request, and then sends a charging response to the session management function device 102.

Step 608: The charging processing device 101 determines to change the first SRQM of the user service or disable suspend quota management of the user service, and saves the changed second SRQM information.

Specifically, in a process of performing step 607, the charging processing device 101 determines, based on the first SRQM information of the user service carried in the charging request, that the user service uses suspend quota management (Suspending). In response to determining that the user account does not meet a condition for the user service to use suspend quota management, the charging processing device 101 determines that the second quota management mode (the second SRQM in this embodiment) of the user service includes resume quota management, or forbids the user service to use suspend quota management. The condition for the user service to use suspend quota management is as follows: A package balance of the user account is greater than a first threshold, or a decrease speed of the balance of the user account is lower than a second threshold, or the like.

Further, in response to determining to change suspend quota management of the user service to resume quota management, the charging processing device 101 further determines to change suspend quota management of another service of the user to resume quota management, or determine to forbid another service of the user to use suspend quota management, or forbid all services of the user to use suspend quota management.

There is no time sequence between step 607 and step 608.

Step 609: The charging processing device 101 sends a notification message (also referred to as a change notification) of changing the first SRQM related information of the user service to the policy control device 104, so that the policy control device 104 generates or updates the control policy of the user service based on the change notification.

Specifically, descriptions of step 609 are consistent with the descriptions of step 555. Details are not described herein again in embodiments described herein.

Descriptions of steps 610 and 611 are consistent with descriptions of steps 556 and 557. Details are not described again in embodiments described herein.

According to at least one embodiment, the policy control device 104 determines, based on the obtained related information of the user, whether the user service uses the non-blocking mode. In addition, in the process of using the user service, the SRQM of the user service is determined or changed based on the account information of the user. Therefore, the SRQM of the user service is more accurate, and risks and losses caused by the use of the non-blocking mode in the process of using the user service is avoided.

Figure 7:
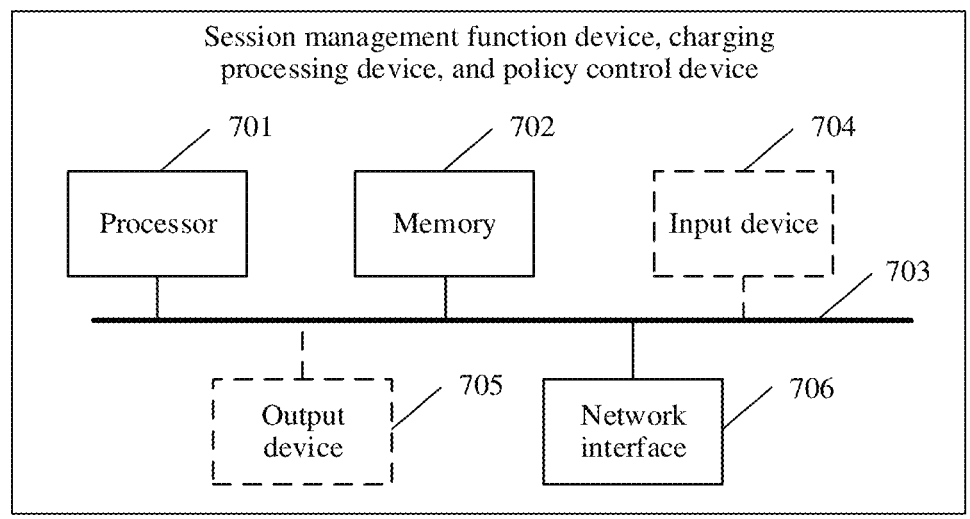
FIG. 7 is a schematic diagram of a hardware structure of a session management function device, a charging processing device, or a policy control device according to at least one embodiment.

FIG. 7 is a diagram of a hardware structure of a session management function device 102, a charging processing device 101, or a policy control device 104 according to at least one embodiment. The session management function device 102 (for example, 102 in FIG. 1A), the charging processing device 101 (for example, 101 in FIG. 1A), and the policy control device 104 (for example, the policy control device 104 in FIG. 1A) in embodiments described herein are implemented by using a general-purpose computer hardware structure shown in FIG. 7, including a processor 701, a memory 702, a bus 703, an input device 704, an output device 705, and a network interface 706, where the input device 704 and the output device 705 are optional.

Specifically, the memory 702 includes a computer storage medium in a form of a volatile memory and/or a non-volatile memory, for example, a read-only memory and/or a random access memory. The memory 702 stores an operating system, an application program, another program module, executable code, and program data.

The input device 704 is configured to enter information, so that a system administrator operates and manages the session management function device, the charging processing device 101, or the policy control device 104. For example, a user account risk threshold is configured on the charging processing device 101, storage space of quota management mode indication information is managed on the session management function device, and storage space of quota management mode indication information is managed on the policy control device 104. The input device 704 is a keyboard or a pointing device, such as a mouse, a trackball, a touchpad, a scanner, or a similar device, and is connected to the processor 701 by using the bus 703.

The output device 705 is configured to output information, so that the system administrator operates and manages the session management function device, the charging processing device 101, or the policy control device 104. For example, the user account risk threshold is displayed on the charging processing device 101, remaining storage space is displayed on the session management function device, or remaining storage space is displayed on the policy control device 104. In addition to a monitor, the output device 705 is another peripheral output device, or is connected to the processor 701 by using the bus 703.

The session management function device 102, the charging processing device 101, or the policy control device 104 are connected to a network by using the network interface 706, for example, connected to a local area network (Local Area Network, LAN). In a network connection environment, a computer-executable instruction stored in the session management function device, the charging processing device 101, or the policy control device 104 is stored in a remote storage device, but is not limited to being stored locally.

In response to the processor 701 in the session management function device 102 executing the executable code or the application program stored in the memory 702, the session management function device 102 performs method steps corresponding to the session management function device 102 in all the foregoing embodiments, for example, steps 206, 310, 351, 332, 353, 357, 404, 405, 406, 407, 411, 310, 351, 332, 353, 357, 604, 605, 606, 607, and 611. For a specific execution process, refer to the foregoing embodiments. Details are not described herein again.

In response to the processor 701 in the charging processing device 101 executing the executable code or the application program stored in the memory 702, the charging processing device 101 performs method steps corresponding to the charging processing device 101 in all the foregoing embodiments, for example, steps 208, 302, 304, 306, 352 to 355, 401, 402, 406 to 409, 502, 504, 506, 552 to 555, 601, 602, and 606 to 609. For a specific execution process, refer to the foregoing embodiments. Details are not described herein again.

In response to the processor 701 in the policy control device 104 executing the executable code or the application program stored in the memory 702, the policy control device 104 performs method steps corresponding to the policy control device 104 in all the foregoing embodiments, for example, steps 202 to 212, 300 to 302, 306 to 310, 355 to 357, 401 to 404, 409 to 411, 500 to 502, 506 to 510, 555 to 557, 5501 to 504, and 509 to 511. For a specific execution process, refer to the foregoing embodiments. Details are not described herein again.

Some of the foregoing steps are performed by two devices because one device performs sending and the other device performs receiving. For example, in step 206, the policy control device 104 sends the first policy, and the session management function device 102 receives the first policy.

Figure 8:
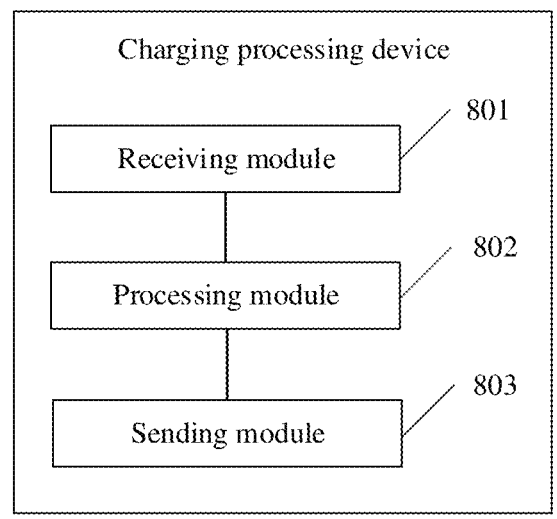
FIG. 8 is a schematic diagram of a logical structure of a charging processing device according to at least one embodiment.

FIG. 8 is a schematic diagram of a logical structure of a charging processing device 101 according to at least one embodiment. The charging processing device 101 (101) is configured to: determine that a first quota management mode of a user service is to be changed, and send a notification message to a policy control device 104, where the notification message carries related information of a second quota management mode of the user service, and the second quota management mode is for changing the first quota management mode. The charging processing device 101 includes:

a processing module 802, configured to determine that the first quota management mode of the user service is to be changed to the second quota management mode, where the processing module 802 is mainly configured to perform steps such as processing and determining performed by the charging processing device 101 in the foregoing embodiment, for example, steps 208, 304, 354, 408, 504, 554, and 608; and a sending module 803, configured to send a notification message to the policy control device 104, where the notification message carries related information of the second quota management mode of the user service, and the second quota management mode is for changing the first quota management mode. The sending module 803 is mainly configured to perform sending steps on the charging processing device 101 side in the foregoing embodiments, for example, steps 208, 306, 353, 355, 402, 407, 409, 506, 553, 555, 602, 607, and 609.

In addition, the charging processing device 101 further includes a receiving module 801, configured to receive a request message sent by the policy control device 104. The receiving module 801 is mainly configured to perform receiving steps on the charging processing device 101 side in the foregoing embodiments, for example, steps 302, 352, 401, 406, 502, 552, 601, and 606.

Figure 9:
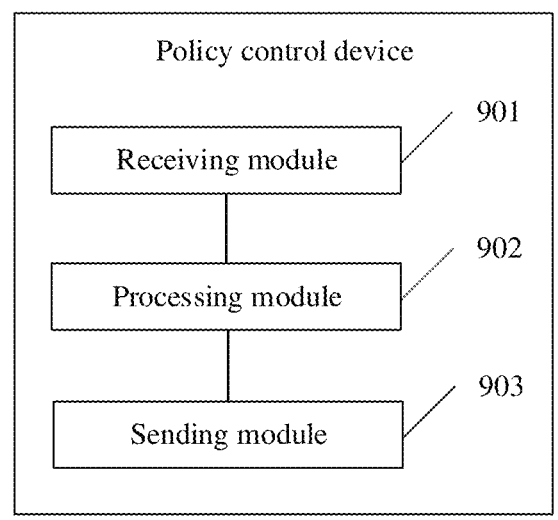
FIG. 9 is a schematic diagram of a logical structure of a policy control device according to at least one embodiment.

FIG. 9 is a schematic diagram of a logical structure of a policy control device 104 (104) according to at least one embodiment. The policy control device 104 (104) is configured to determine a policy for a user service. The policy control device 104 (104) includes:

a receiving module 901, configured to receive the related information of a second quota management mode that is sent by a charging processing device 101 and that is for changing a first quota management mode, where the receiving module 901 is mainly configured to perform receiving steps performed by the policy control device 104 in the foregoing embodiments, for example, steps 208, 306, 355, 402, 409, 506, 555, 602, and 609;

a processing module 902, configured to: determine the first quota management mode of the user service, generate a first policy of the user service based on the first quota management mode, determine the second quota management mode based on the related information of the second quota management mode of the user service, and generate a second policy of the user service based on the second quota management mode, where the second policy is for updating or replacing the first policy, where the processing module 902 is mainly configured to perform steps of determining, processing, and generating policies performed by the policy control device 104 in the foregoing embodiments, for example, steps 202 to 204, 210 to 212, 304, 354, 403, 410, 504, 554, 603, and 610; and a sending module 903, configured to send the first policy to a session management function device 102, to indicate the session management function device 102 to perform the first quota management mode on the user service, where the sending module 903 is mainly configured to perform sending steps performed by the policy control device 104 in the foregoing embodiments, for example, steps 206, 302, 310, 357, 401, 404, 411, 502, 510, 557, 601, 604, and 611.

The charging processing device 101 shown in FIG. 8 and the policy control device 104 shown in FIG. 9 are presented in a form of functional modules. The "module" herein is an application-specific integrated circuit (application-specific integrated circuit, ASIC), a circuit, a processor and a memory that execute one or more software or firmware programs, an integrated logic circuit, and/or another device that provides the foregoing functions. In at least one embodiment, a person skilled in the art is able to figure out that these devices are alternatively in the form shown in FIG. 6. For example, the receiving module 801, the processing module 802, the sending module 803, the receiving module 901, the processing module 802, and the sending module 903 are implemented by using the processor 701 and the memory 702 in FIG. 6. For example, the embodiments are implemented by executing code stored in the memory 702 by the processor 701.

A person of ordinary skill in the art is aware that, in combination with the examples described in embodiments disclosed in this specification, units and algorithm steps is implemented by electronic hardware, computer software, or a combination thereof. To clearly describe the interchangeability between the hardware and the software, the foregoing has generally described compositions and steps of each example according to functions. Whether the functions are executed by hardware or software depends on particular applications and design constraints of the technical solutions. A person skilled in the art is able to use different methods to implement the described functions for each particular application, but does not go beyond the scope of this application.

A person of ordinary skill in the art understands that, for ease and brief description, for a detailed working process of the foregoing system, apparatus and units, refer to a corresponding process in the foregoing method embodiments, and details are not described herein again.

In at least one embodiment, the disclosed system, apparatus, and method are implemented in other manners. For example, the unit division is merely logical function division and is other division in actual implementation. For example, a plurality of units or components is combined or integrated into another system, or some features is ignored or may not be performed. In addition, the displayed or discussed mutual couplings or direct couplings or communication connections is implemented through some interfaces. The indirect couplings or communication connections between the apparatuses or units is implemented in electrical, mechanical, or other forms.

The units described as separate parts may or may not be physically separate, and parts displayed as units may or may not be physical units, in other words, is located in one position, or is distributed on a plurality of network units. Some or all of the units is selected according to actual conditions to achieve the objectives of the solutions of embodiments described herein.

In addition, functional units in at least one embodiment is integrated into one processing unit, each of the units exist alone physically, or two or more units is integrated into one unit. The integrated unit is implemented in a form of hardware, or is implemented in a form of a software functional unit.

In response to the integrated unit being implemented in the form of a software functional unit and sold or used as an independent product, the integrated unit is stored in a computer-readable storage medium. Based on such an understanding, technical solutions, or a part contributing to the current technology, or all or some of the technical solutions is implemented in a form of a software product. The computer software product is stored in a storage medium and includes several instructions for instructing a computer device (which is a personal computer, a server, a network device, or the like) to perform all or some of the steps of the method in embodiments described herein. The foregoing storage medium includes any medium that stores program code, such as a USB flash drive, a removable hard disk, a read-only memory, a random access memory, a magnetic disk, or an optical disc.

The foregoing descriptions are merely specific implementations, but are not intended to limit the protection scope embodiments described herein. Any modification or replacement readily figured out by a person skilled in the art within the technical scope disclosed herein fall within the protection scope of embodiments described herein. Therefore, the protection scope of embodiments described herein are subject to the protection scope of the claims.

What is claimed is:

1. A user service processing method, comprising:
   generating, by a policy control device, a first policy of a user service of a user, and sending the first policy to a session management function device, wherein the first policy indicates whether to perform a first quota management mode on the user service;
   receiving, by the policy control device, related information, from a charging processing device and that is usable for changing the first quota management mode, of a second quota management mode of the user or the user service;
   determining, by the policy control device, the second quota management mode of the user service based on the related information of the second quota management mode of the user or the user service; and
   generating, by the policy control device, a second policy of the user service, wherein the second policy is usable for updating or replacing the first policy and for indicating whether to perform the second quota management mode on the user service,
   wherein
   the first quota management mode includes a first initial quota request mode and the second quota management mode includes a second initial quota request mode: or
   the first quota management mode includes one of suspend quota management or resume quota management, and the second quota management mode includes the other of the resume quota management or the suspend quota management.

2. The method according to claim 1, wherein
   the first initial quota request mode includes a blocking mode, and the second initial quota request mode includes a non-blocking mode; or the first initial quota request mode includes the non-blocking mode, and the second initial quota request mode includes the blocking mode; or
   the first quota management mode includes the suspend quota management and the second quota management mode includes the resume quota management; or the first quota management mode includes the resume quota management and the second quota management mode includes the suspend quota management.

3. The method according to claim 1, wherein the method further comprises:
   receiving, by the policy control device, related information of the first quota management mode of the user or the user service, wherein the related information of the first quota management mode is received from the charging processing device; and
   determining, by the policy control device, the first quota management mode of the user service based on the related information of the first quota management mode of the user or the user service.

4. The method according to claim 1, wherein the method further comprises:
   sending, by the policy control device, a request message to the charging processing device;
   receiving, by the policy control device, a response message from the charging processing device, wherein the response message carries related information of the first quota management mode of the user or the user service; and determining, by the policy control device, the first quota management mode of the user service based on the related information of the first quota management mode of the user or the user service.

5. The method according to claim 4, wherein the first quota management mode includes the first initial quota request mode, and the request message further carries an obtaining indication for the first quota management mode, wherein the obtaining indication includes an identifier of the user and indication information for obtaining a service list in a non-blocking mode of the user, and the related information of the first quota management mode carried in the response message includes a list of services of the user that are allowed to use the first initial quota request mode in the non-blocking mode; or the obtaining indication includes an identifier of the user service and indication information for obtaining whether a user service is allowed to use the first initial quota request mode in the non-blocking mode, and the related information of the first quota management mode carried in the response message includes indication information of whether the user service is allowed to use the first initial quota request mode in the non-blocking mode; or the obtaining indication includes an identifier of the user and indication information for obtaining whether the user service is allowed to use the first initial quota request mode in the non-blocking mode, and the related information of the first quota management mode carried in the response message includes indication information of whether the user service is allowed to use the first initial quota request mode in the non-blocking mode; or the obtaining indication includes an identifier of the user service and indication information for obtaining the first initial quota request mode of the user service, the related information of the first quota management mode carried in the response message includes the first initial quota request mode of the user service, and the first initial quota request mode includes a blocking mode or the non-blocking mode; or the obtaining indication includes an identifier of the user and indication information for obtaining a first initial quota request mode of services of the user, the related information of the first quota management mode carried in the response message includes the first initial quota request mode of the services of the user, and the first initial quota request mode includes the blocking mode or the non-blocking mode.

6. The method according to claim 4, wherein the first quota management mode includes the suspend quota management or the resume quota management, and the request message further carries an obtaining indication for the first quota management mode, wherein the obtaining indication includes an identifier of the user and indication information for obtaining a service list that allows the suspend quota management and that is of the user, and the related information of the first quota management mode carried in the response message includes a service list that allows the suspend quota management and that is of the user; or the obtaining indication includes an identifier of the user service and indication information for obtaining whether the user service allows the suspend quota management, and the related information of the first quota management mode carried in the response message includes indication information of whether quota management of the user service is allowed to be suspended; or the obtaining indication includes an identifier of the user and indication information for obtaining whether quota management of the user service is allowed to be suspended, and the related information of first quota management mode carried in the response message includes indication information of whether quota management of the user service is allowed to be suspended; or the obtaining indication includes an identifier of the user service and indication information for obtaining the first quota management mode of the user service, the related information of the first quota management mode carried in the response message includes the first quota management mode of the user service, and the first quota management mode includes the suspend quota management or the resume quota management; or the obtaining indication includes an identifier of the user and indication information for obtaining quota management modes of services of the user, the related information of the first quota management mode carried in the response message includes information about the first quota management mode of the services of the user, and the first quota management mode includes the suspend quota management or the resume quota management.

7. The method according to claim 4, wherein
the related information of the first quota management mode of the user or the user service is indication information indicating whether the user service is allowed to use a non-blocking mode, or indication information indicating whether quota management of the user service is allowed to be suspended.

8. The method according to claim 1, wherein the receiving, by the policy control device, the related information of the second quota management mode from the charging processing device and that is for changing the first quota management mode includes:

receiving, by the policy control device, a notification message for the user or the user service, wherein the notification message is received from the charging processing device, and carries related information of the second quota management mode of the user service.

9. A user service processing method, comprising:
determining, by a charging processing device, that a first quota management mode of a user service of a user is to be changed to a second quota management mode; and sending, by the charging processing device, a notification message to a policy control device, wherein the notification message carries related information of the second quota management mode of the user or the user service, wherein
the first quota management mode includes a first initial quota request mode and the second quota management mode includes a second initial quota request mode; or
the first quota management mode includes one of suspend quota management or resume quota management, and the second quota management mode includes the other of the resume quota management or the suspend quota management.

10. The method according to claim 9, wherein
the first initial quota request mode includes a blocking mode, and the second initial quota request mode includes a non-blocking mode; or the first initial quota request mode includes the non-blocking mode, and the second initial quota request mode includes the blocking mode; or
the first quota management mode includes the suspend quota management and the second quota management mode includes the resume quota management; or the first quota management mode includes the resume quota management and the second quota management mode includes the suspend quota management.

11. The method according to claim 9, further comprising:
in response to processing a charging request of the user service, or processing a charging request of another service of the user, or performing a charging management process on an account of the user, determining that the first quota management mode of the user service is to be changed.

12. The method according to claim 9, wherein that the charging processing device determines that the first quota management mode of the user service is to be changed to the second quota management mode includes:
receiving a charging request of the user service, wherein the charging request includes indication information indicating that the user service uses the first quota management mode; and
determining, based on the indication information of the first quota management mode, that the first quota management mode of the user service is to be changed to the second quota management mode; or
determining, by the charging processing device, that related information of the first quota management mode of the user service has been sent to the policy control device; and
determining, by the charging processing device based on the first quota management mode, to change the first quota management mode of the user service to the second quota management mode.

13. The method according to claim 9, wherein the first quota management mode includes the first initial quota request mode in a blocking mode or a non-blocking mode, and the related information of the second quota management mode for changing the first quota management mode includes:
an updated list of services of the user that are allowed to use the second initial quota request mode in the non-blocking mode;
updated indication information indicating whether the user service is allowed to use the second initial quota request mode in the non-blocking mode;
updated indication information indicating whether the user service is allowed to use the second initial quota request mode in the non-blocking mode; or
an updated second initial quota request mode of the user service.

14. The method according to claim 9, wherein the first quota management mode includes the suspend quota management or the resume quota management, and the related information of the second quota management mode for changing the first quota management mode includes:
an updated service list that allows the suspend quota management and that is of the user;
updated indication information indicating whether quota management of the user service is allowed to be suspended;
updated indication information indicating whether quota management of the user service is allowed to be suspended; or
an updated quota management mode that is of the user service and that suspends or resumes quota management.

15. The method according to claim 9, wherein the method further comprises:
determining, by the charging processing device, that there is a resource created for the user; and
the sending the notification message to the policy control device includes: sending the notification message to the policy control device based on a notification address corresponding to the resource.

16. The method according to claim 9, wherein the method further comprises:
receiving a request message from the policy control device; and
sending a response message to the policy control device, wherein the response message carries related information of the first quota management mode of the user or the user service.

17. The method according to claim 16, wherein
the related information of the first quota management mode of the user or the user service is indication information indicating whether the user service is allowed to use a non-blocking mode, or indication information indicating whether quota management of the user service is allowed to be suspended.

18. A user service processing method, comprising:
determining, by a policy control device, a first quota management mode of a user service;
generating, by the policy control device, a first policy of the user service based on the first quota management mode, and sending the first policy to a session management function device, wherein the first policy indicates whether to perform the first quota management mode on the user service;
receiving, by the policy control device from a charging processing device, related information of a second quota management mode of the user service that is for changing the first quota management mode;
determining, by the policy control device, the second quota management mode based on the related information of the second quota management mode of the user service; and
generating, by the policy control device, a second policy of the user service based on the second quota management mode, wherein the second policy is for updating or replacing the first policy, and indicates whether to perform the second quota management mode on the user service,
wherein
the first quota management mode includes a first initial quota request mode and the second quota management mode includes a second initial quota request mode: or
the first quota management mode includes one of suspend quota management or resume quota management, and the second quota management mode includes the other of the resume quota management or the suspend quota management.

19. The method according to claim 18, wherein the method further comprises:
receiving, by the policy control device, related information of the first quota management mode of the user service, wherein the related information of the first quota management mode is received from the charging processing device; and determining, by the policy control device, the first quota management mode of the user service based on the related information of the first quota management mode of the user or the user service.

20. The method according to claim 18, wherein the method further comprises:

sending, by the policy control device, a request message to the charging processing device;

receiving, by the policy control device, a response message from the charging processing device, wherein the response message carries related information of the first quota management mode of the user service; and determining, by the policy control device, the first quota management mode of the user service based on the related information of the first quota management mode of the user or the user service.

* * * * *